(12) United States Patent
Xiong et al.

(10) Patent No.: US 11,006,397 B2
(45) Date of Patent: May 11, 2021

(54) MULTIPLEXING PHYSICAL UPLINK CONTROL CHANNELS IN A SLOT FOR A NEW RADIO (NR) SYSTEM

(71) Applicant: APPLE INC., Cupertino, CA (US)

(72) Inventors: Gang Xiong, Portland, OR (US); Hong He, Sunnyvale, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/404,609

(22) Filed: May 6, 2019

(65) Prior Publication Data

US 2019/0261361 A1 Aug. 22, 2019

Related U.S. Application Data

(60) Provisional application No. 62/697,812, filed on Jul. 13, 2018, provisional application No. 62/682,667, filed on Jun. 8, 2018.

(51) Int. Cl.
| | |
|---|---|
| *H04W 72/04* | (2009.01) |
| *H04W 72/12* | (2009.01) |
| *H04L 1/18* | (2006.01) |
| *H04L 5/00* | (2006.01) |
| *H04W 72/02* | (2009.01) |
| *H04W 72/10* | (2009.01) |

(52) U.S. Cl.
CPC ....... *H04W 72/0413* (2013.01); *H04L 1/1812* (2013.01); *H04L 1/1854* (2013.01); *H04L 5/0055* (2013.01); *H04W 72/02* (2013.01); *H04W 72/0446* (2013.01); *H04W 72/10* (2013.01); *H04W 72/1247* (2013.01)

(58) Field of Classification Search
CPC ............. H04W 72/0413; H04W 72/10; H04W 72/1247; H04W 72/02; H04W 72/0446; H04L 1/1812; H04L 5/0055; H04L 1/1854; H04L 1/1671; H04L 1/0026; H04L 5/0053
See application file for complete search history.

(56) References Cited

U.S. PATENT DOCUMENTS

| | | | | |
|---|---|---|---|---|
| 2014/0010126 A1* | 1/2014 | Sayana | ............... | H04B 7/0626 370/280 |
| 2014/0036664 A1* | 2/2014 | Han | ................... | H04L 41/0836 370/230 |

(Continued)

*Primary Examiner* — Un C Cho
*Assistant Examiner* — Lalita W Pace

(57) ABSTRACT

Technology for a UE is disclosed. The UE can identify that a resource for a PUCCH transmission with HARQ-ACK information and/or a resource for a PUCCH associated with a SR overlap in time with two resources for respective PUCCH transmissions with two CSI reports. The UE can select a resource for a PUCCH transmission with a CSI report having a higher priority from the two resources for respective PUCCH transmissions with the two CSI reports. The UE can multiplex the HARQ-ACK information and/or the SR in the selected resource for the PUCCH transmission with the CSI report having the higher priority. The UE can encode the multiplexed HARQ-ACK information and the SR and the CSI report for transmission on the selected resource for the PUCCH transmission to a NR base station. The UE can drop the CSI report and the PUCCH resource having a lower priority.

12 Claims, 15 Drawing Sheets

(56) References Cited

U.S. PATENT DOCUMENTS

| | | | |
|---|---|---|---|
| 2014/0036704 A1* | 2/2014 | Han | H04L 1/1671 |
| | | | 370/252 |
| 2018/0139701 A1* | 5/2018 | Wang | H04W 52/34 |
| 2018/0331743 A1* | 11/2018 | Shen | H04B 7/0626 |
| 2019/0104565 A1* | 4/2019 | Park | H04W 76/27 |
| 2019/0223036 A1* | 7/2019 | Lunttila | H04L 5/0094 |
| 2020/0014517 A1* | 1/2020 | Takeda | H04L 5/0053 |
| 2020/0022161 A1* | 1/2020 | Yang | H04L 27/26 |

* cited by examiner

MULTIPLEXING PHYSICAL UPLINK CONTROL CHANNELS IN A SLOT FOR A NEW RADIO (NR) SYSTEM

RELATED APPLICATIONS

The present application claims the benefit of U.S. Provisional Patent Application No. 62/682,667 filed Jun. 8, 2018 and U.S. Provisional Patent Application No. 62/697,812 filed Jul. 13, 2018, the entire specifications of which are hereby incorporated by reference in their entirety for all purposes.

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
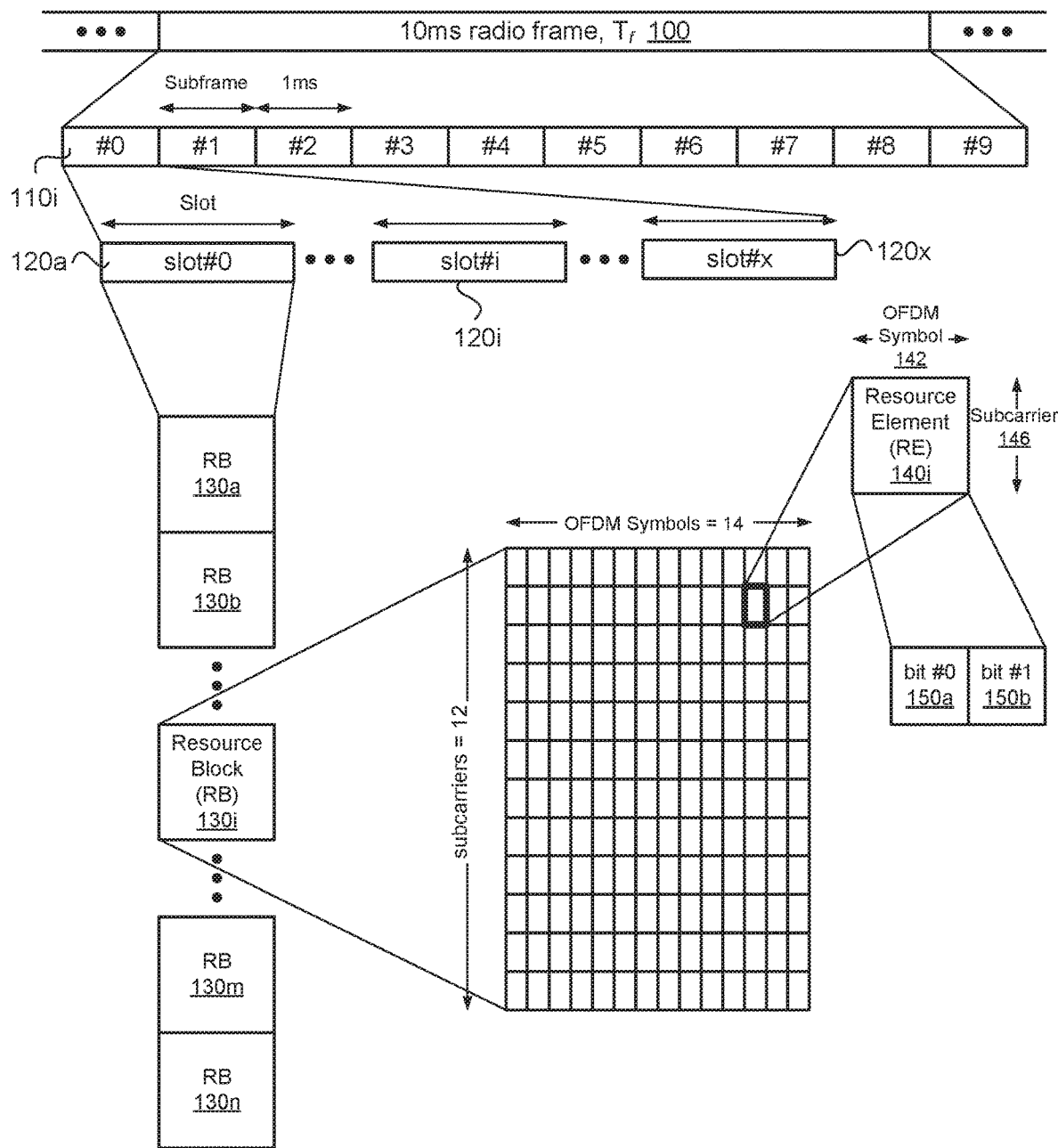
FIG. 1 illustrates a block diagram of a Third-Generation Partnership Project (3GPP) New Radio (NR) Release 15 frame structure in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Definitions

As used herein, the term "User Equipment (UE)" refers to a computing device capable of wireless digital communication such as a smart phone, a tablet computing device, a laptop computer, a multimedia device such as an iPod Touch®, or other type computing device that provides text or voice communication. The term "User Equipment (UE)" may also be referred to as a "mobile device," "wireless device," of "wireless mobile device."

As used herein, the term "Base Station (BS)" includes "Base Transceiver Stations (BTS)," "NodeBs," "evolved NodeBs (eNodeB or eNB)," "New Radio Base Stations (NR BS) and/or "next generation NodeBs (gNodeB or gNB)," and refers to a device or configured node of a mobile phone network that communicates wirelessly with UEs.

As used herein, the term "cellular telephone network," "4G cellular," "Long Term Evolved (LTE)," "5G cellular" and/or "New Radio (NR)" refers to wireless broadband technology developed by the Third Generation Partnership Project (3GPP).

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 provides an example of a 3GPP NR Release 15 frame structure. In particular, FIG. 1 illustrates a downlink radio frame structure. In the example, a radio frame 100 of a signal used to transmit the data can be configured to have a duration, $T_f$, of 10 milliseconds (ms). Each radio frame can be segmented or divided into ten subframes 110$i$ that are each 1 ms long. Each subframe can be further subdivided into one or multiple slots 120$a$, 120$i$, and 120$x$, each with a duration, $T_{slot}$, of 1/µ ms, where µ=1 for 15 kHz subcarrier spacing, µ=2 for 30 kHz, µ=4 for 60 kHz, µ=8 for 120 kHz, and u=16 for 240 kHz. Each slot can include a physical downlink control channel (PDCCH) and/or a physical downlink shared channel (PDSCH).

Each slot for a component carrier (CC) used by the node and the wireless device can include multiple resource blocks (RBs) 130$a$, 130$b$, 130$i$, 130$m$, and 130$n$ based on the CC frequency bandwidth. The CC can have a carrier frequency having a bandwidth. Each slot of the CC can include downlink control information (DCI) found in the PDCCH. The PDCCH is transmitted in control channel resource set (CORESET) which can include one, two or three Orthogonal Frequency Division Multiplexing (OFDM) symbols and multiple RBs.

Each RB (physical RB or PRB) can include 12 subcarriers (on the frequency axis) and 14 orthogonal frequency-division multiplexing (OFDM) symbols (on the time axis) per slot. The RB can use 14 OFDM symbols if a short or normal cyclic prefix is employed. The RB can use 12 OFDM symbols if an extended cyclic prefix is used. The resource block can be mapped to 168 resource elements (REs) using short or normal cyclic prefixing, or the resource block can be mapped to 144 REs (not shown) using extended cyclic prefixing. The RE can be a unit of one OFDM symbol 142 by one subcarrier (i.e., 15 kHz, 30 kHz, 60 kHz, 120 kHz, and 240 kHz) 146.

Each RE 140$i$ can transmit two bits 150$a$ and 150$b$ of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

This example of the 3GPP NR Release 15 frame structure provides examples of the way in which data is transmitted, or the transmission mode. The example is not intended to be limiting. Many of the Release 15 features will evolve and change in the 5G frame structures included in 3GPP LTE Release 15, MulteFire Release 1.1, and beyond. In such a system, the design constraint can be on co-existence with multiple 5G numerologies in the same carrier due to the coexistence of different network services, such as eMBB (enhanced Mobile Broadband), mMTC (massive Machine Type Communications or massive IoT) and URLLC (Ultra Reliable Low Latency Communications or Critical Communications). The carrier in a 5G system can be above or below 6 GHz. In one embodiment, each network service can have a different numerology.

In one configuration, mobile communication has evolved from early voice systems to today's highly sophisticated integrated communication platform. The next generation wireless communication system, 5G, or new radio (NR) can provide access to information and sharing of data by various users and applications. NR is expected to be a unified network/system that is targeted to meet different and sometimes conflicting performance dimensions and services. Such diverse multi-dimensional specifications are driven by different services and applications. In general, NR can evolve based on 3GPP LTE-Advanced with additional potential new Radio Access Technologies (RATs) to enrich people's lives with better, simple and seamless wireless connectivity solutions. NR can enable devices connected by wireless and deliver fast, rich contents and services.

Figure 2:
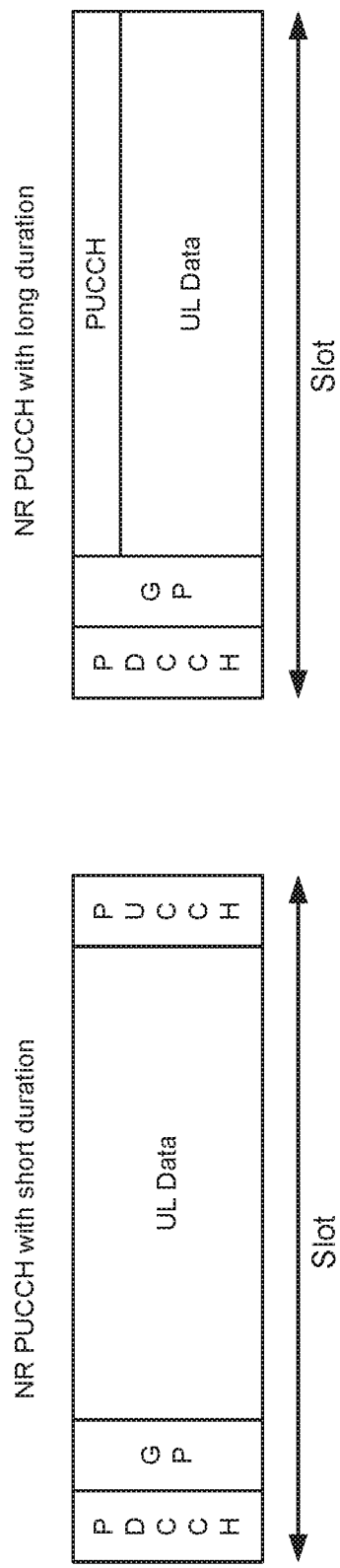
FIG. 2 illustrates an NR physical uplink control channel (PUCCH) with a short and long duration in an uplink (UL) data slot in accordance with an example.

FIG. 2 illustrates an example of a NR physical uplink control channel (PUCCH) with a short and long duration in an uplink (UL) data slot. For a NR PUCCH with a short duration, the NR PUCCH and a physical uplink shared channel (PUSCH) can be multiplexed in a time division multiplexing (TDM) manner, which can be targeted for low latency application. For a NR PUCCH with a long duration, multiple OFDM symbols can be allocated for the NR PUCCH to improve link budget and uplink coverage for control channel. More specifically, for the UL data slot, the NR PUCCH and the PUSCH can be multiplexed in a frequency division multiplexing (FDM) manner.

In FIG. 2, in order to accommodate the downlink (DL) to UL and UL to DL switching time and round-trip propagation delay, a guard period (GP) can be inserted between an NR physical downlink shared channel (NR PDSCH) and an NR physical uplink control channel (NR PUCCH), as well as an NR physical downlink control channel (NR PDCCH) and an NR physical uplink shared channel (NR PUSCH).

In one example, in NR, a short PUCCH (PUCCH format 0 and 2) can span 1 or 2 symbols and a long PUCCH (PUCCH format 1, 3 and 4) can span from 4 to 14 symbols within a slot. Further, a long PUCCH can span multiple slots to further enhance the coverage. In addition, for a given UE, two short PUCCHs as well as a short PUCCH and long PUCCH can be multiplexed in a TDM manner in a same slot.

In one example, in NR, uplink control information (UCI) can be carried by a PUCCH or PUSCH. In particular, UCI can include a scheduling request (SR), hybrid automatic repeat request-acknowledgement (HARQ-ACK) feedback, channel state information (CSI) report, e.g., channel quality indicator (CQI), pre-coding matrix indicator (PMI), CSI resource indicator (CRI) and rank indicator (RI) and/or beam related information (e.g., L1-RSRP (layer 1-reference signal received power)).

In one example, in NR, when PUCCH resources carrying different UCI types overlap at least one symbol in time in a slot and if the UE is provided a higher layer parameter simultaneousHARQ-ACK-CSI, the UE can multiplex dynamic HARQ-ACK and/or SR and/or one or more CSI in a resource which is indicated by a PUCCH resource indication field in downlink control information (DCI) scheduling a PDSCH reception according to a payload size of the combined UCI.

Figure 3:
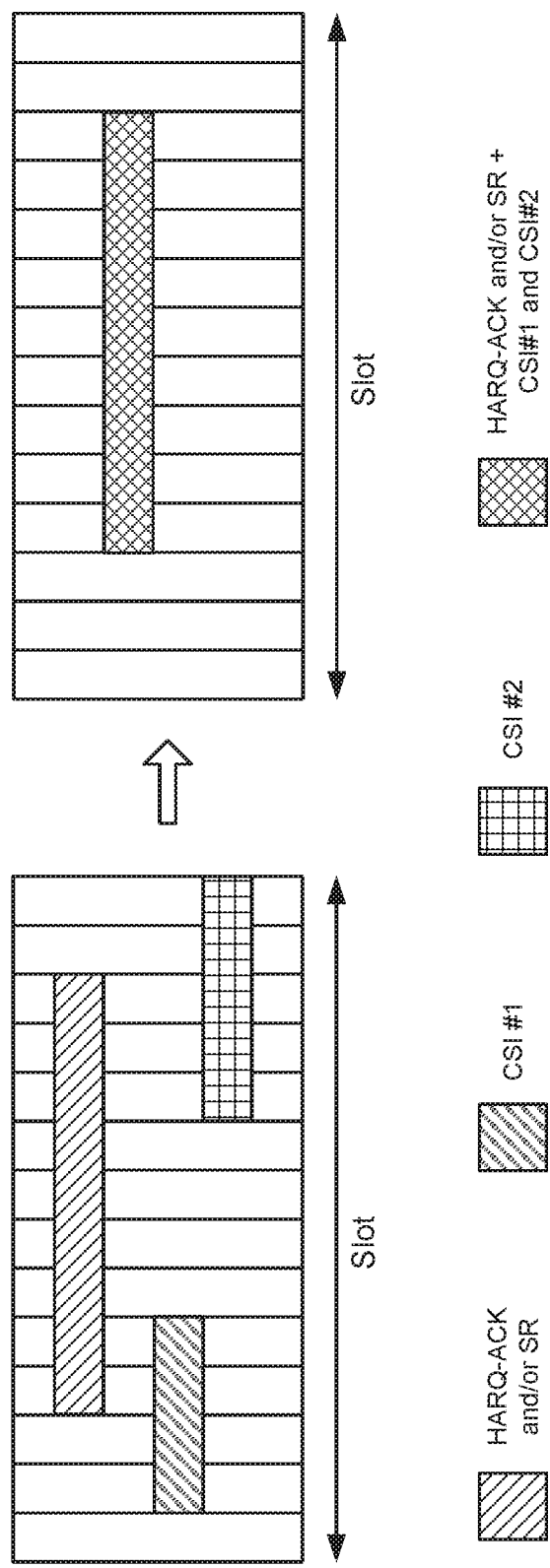
FIG. 3 illustrates a multiplexing of dynamic hybrid automatic repeat request acknowledgement (HARQ-ACK)/scheduling request (SR) and channel state information (CSI) in accordance with an example.

FIG. 3 illustrates an example of a multiplexing of dynamic hybrid automatic repeat request acknowledgement (HARQ-ACK)/scheduling request (SR) and channel state information (CSI). In this example, when HARQ-ACK and/or SR collides in time with multiple CSI reports in a slot, a new PUCCH resource can be determined based on the PUCCH resource indication field in the DCI scheduling a PDSCH reception and combined UCI payload size.

However, when the UE is not provided the high layer parameter multi-CSI-PUCCH-ResourceList and when the HARQ-ACK is in response to a PDSCH reception without a corresponding PDCCH, such as semi-persistent scheduling (SPS) HARQ-ACK, given that PDCCH with UL grant and thus PUCCH resource indication field are not present, there is no PUCCH resource available to carry the combined UCI payload including HARQ-ACK/SR and CSI. Hence, certain mechanisms should be defined to allow multiplexing of multiple PUCCHs in a slot to ensure alignment between a gNB (or NR base station) and the UE.

As described in further detail below, various techniques are provided for multiplexing multiple PUCCHs in a slot. For example, mechanisms are provided for multiplexing multiple PUCCHs when one or more semi-persistent scheduling (SPS) HARQ-ACK and/or SR PUCCH resource overlaps with two or more non-overlapping CSI PUCCH. In addition, mechanisms are provided for multiplexing multiple PUCCHs when two or more non-overlapping PUCCH resources include at least two long PUCCHs.

In one example, the following examples assume that timeline prerequisites defined for partial overlapping of multiple PUCCHs are satisfied.

In one configuration, multiple PUCCHs can be multiplexed when one or more SPS HARQ-ACK and/or SR PUCCH resource overlaps with two or more non-overlapping CSI PUCCH.

In one example, when the UE is not provided the high layer parameter multi-CSI-PUCCH-ResourceList and when the HARQ-ACK is in response to a PDSCH reception without a corresponding PDCCH, i.e., SPS HARQ-ACK, given that PDCCH with UL grant and thus PUCCH resource indication field are not present, there is no PUCCH resource available to carry the combined UCI payload including HARQ-ACK/SR and CSI. Hence, certain mechanisms are to be defined to allow multiplexing of multiple PUCCHs in a slot to ensure alignment between the gNB and UE.

In one example, examples of multiplexing multiple PUCCHs when one or more SPS HARQ-ACK and/or SR PUCCH resource overlaps with two or more non-overlapping CSI PUCCHs are provided below.

In one example, when the UE is not provided the high layer parameter multi-CSI-PUCCH-ResourceList and when the HARQ-ACK is in response to a PDSCH reception without a corresponding PDCCH, i.e., SPS HARQ-ACK, when one or more SPS HARQ-ACK and/or SR PUCCH resource overlaps with two or more non-overlapping CSI PUCCHs, the SPS HARQ-ACK and/or SR can be multiplexed with an earliest CSI PUCCH resource. Alternatively, the SPS HARQ-ACK and/or SR can be multiplexed with a PUCCH resource carrying CSI with a lowest resource ID in the slot.

Figure 4:
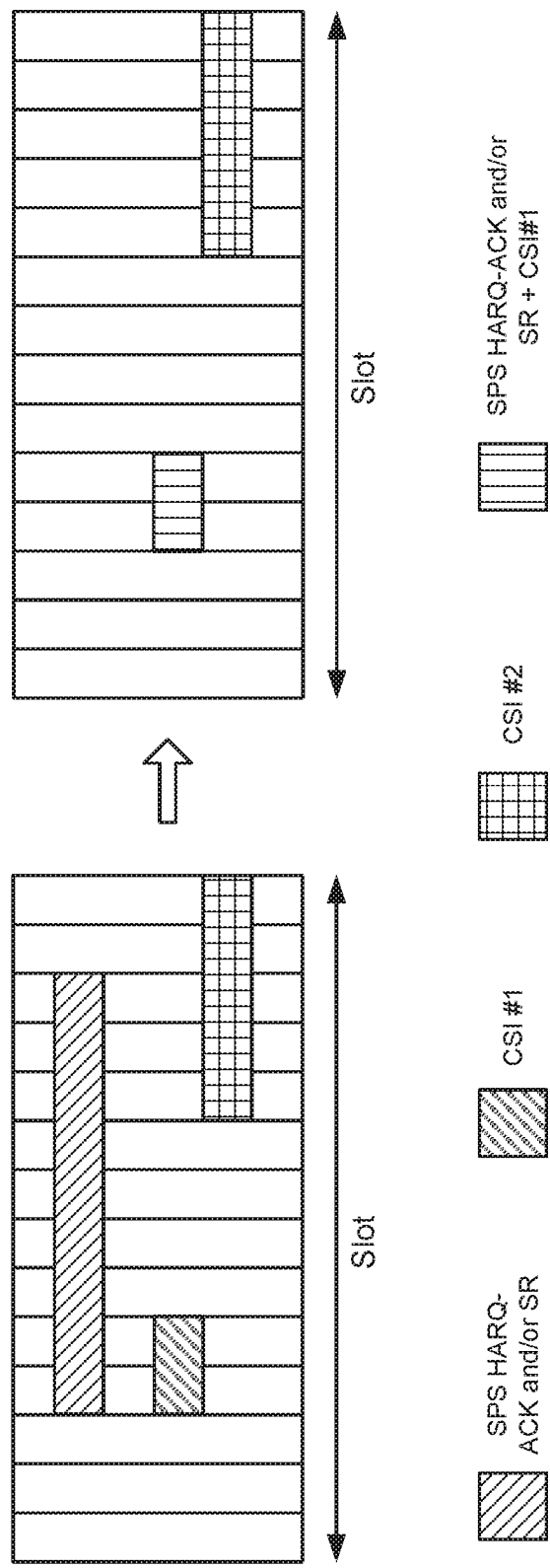
FIG. 4 illustrates a first option for a multiplexing of semi-persistent scheduling (SPS) HARQ-ACK/SR and CSI in accordance with an example.

FIG. 4 illustrates an example of a first option for a multiplexing of semi-persistent scheduling (SPS) HARQ-ACK/SR and CSI in a slot. In this example, SPS HARQ-ACK and/or SR can overlap with two CSI PUCCHs, including CSI #1 and CSI #2. Based on the aforementioned examples, the SPS HARQ-ACK and/or SR can be multiplexed in the first CSI #1 PUCCH.

In one example, when the UE is not provided the high layer parameter multi-CSI-PUCCH-ResourceList and when the HARQ-ACK is in response to a PDSCH reception without a corresponding PDCCH, i.e., SPS HARQ-ACK, when one or more SPS HARQ-ACK and/or SR PUCCH resource overlaps with two or more non-overlapping CSI PUCCHs, the SPS HARQ-ACK and/or SR and all CSI reports can be multiplexed with an earliest CSI PUCCH resource. Alternatively, the SPS HARQ-ACK and/or SR and all CSI reports can be multiplexed with the PUCCH resource carrying CSI with a lowest resource ID in the slot.

Figure 5:
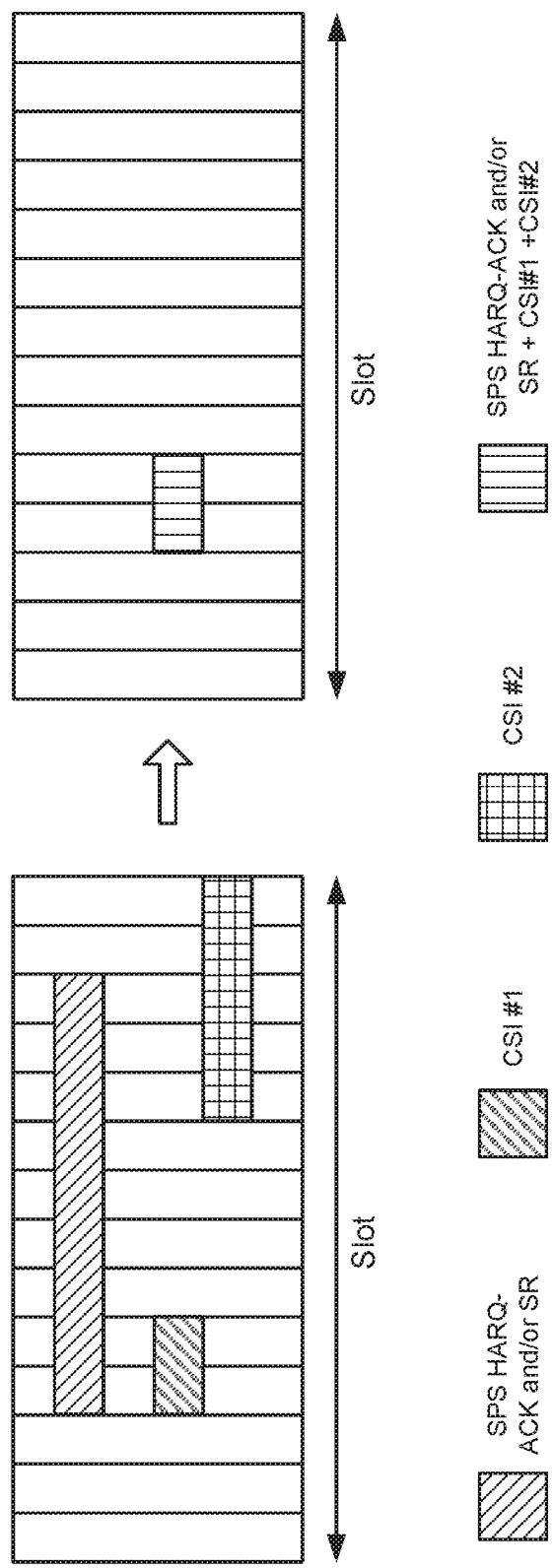
FIG. 5 illustrates a second option for a multiplexing of SPS HARQ-ACK/SR and CSI in accordance with an example.

FIG. 5 illustrates an example of a second option for a multiplexing of SPS HARQ-ACK/SR and CSI in a slot. In this example, the SPS HARQ-ACK and/or SR and all CSI reports can be multiplexed in the CSI #1 PUCCH resource.

In one example, when the UE is not provided the high layer parameter multi-CSI-PUCCH-ResourceList and when the HARQ-ACK is in response to a PDSCH reception without a corresponding PDCCH, i.e., SPS HARQ-ACK, when one or more SPS HARQ-ACK and/or SR PUCCH resource overlaps with two or more non-overlapping CSI PUCCHs, the SPS HARQ-ACK and/or SR and all CSI reports can be multiplexed with a CSI PUCCH resource with a largest capacity, i.e., carrying a largest payload.

Figure 6:
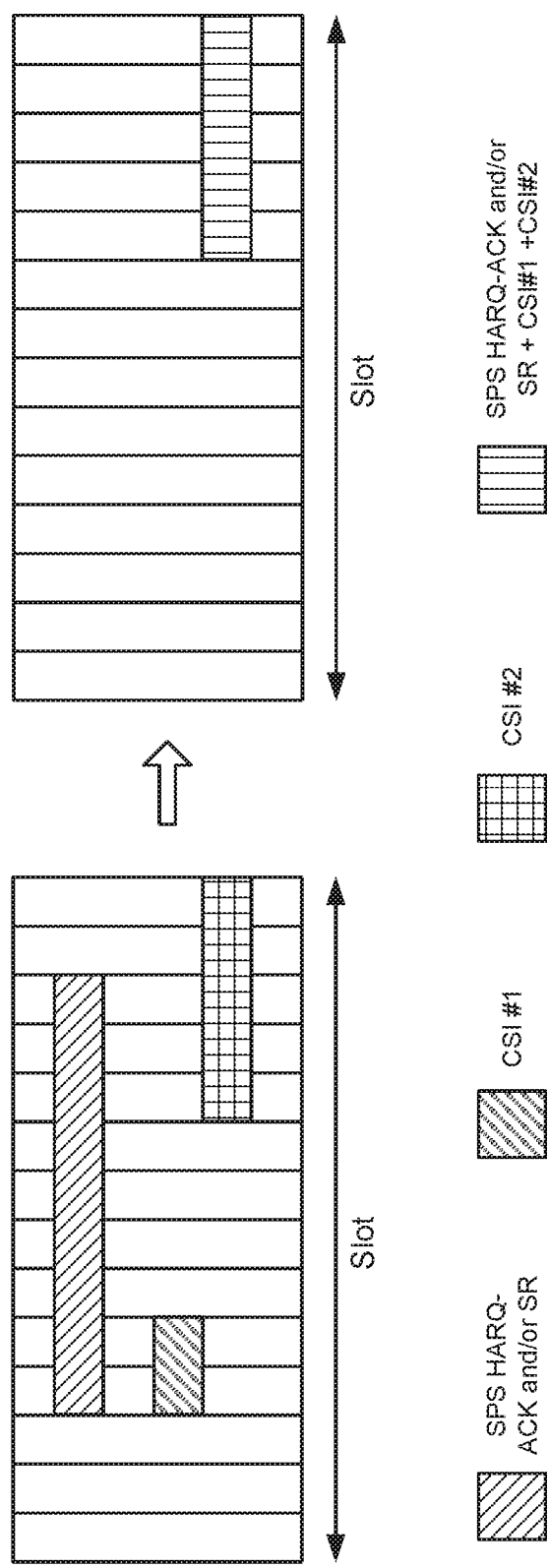
FIG. 6 illustrates a third option for a multiplexing of SPS HARQ-ACK/SR and CSI in accordance with an example.

FIG. 6 illustrates an example of a third option for a multiplexing of SPS HARQ-ACK/SR and CSI in a slot. In this example, a CSI #2 PUCCH resource can have a larger capacity than a CSI #1 PUCCH resource. Then, the SPS HARQ-ACK and/or SR and all CSI reports can be multiplexed in the CSI #2 PUCCH resource.

In one example, when the UE is not provided the high layer parameter multi-CSI-PUCCH-ResourceList and when the HARQ-ACK is in response to a PDSCH reception without a corresponding PDCCH, i.e., SPS HARQ-ACK, when one or more SPS HARQ-ACK and/or SR PUCCH resource overlaps with two or more non-overlapping CSI PUCCHs, CSI report and corresponding PUCCH resource with a highest priority can be selected among two or more non-overlapping CSI PUCCHs. Subsequently, the SPS HARQ-ACK and/or SR and selected CSI report can be multiplexed on the selected CSI PUCCH with the highest priority. Further, CSI report with lower priority and corresponding PUCCH resource are dropped.

In one configuration, CSI reports can be associated with a priority value $\text{Pri}_{iCSI}(y,k,c,s) = 2 \cdot N_{cells} \cdot M_s \cdot N_{cells} \cdot M_s \cdot k + M_s$, where y=0 for aperiodic CSI reports to be carried on PUSCH y=1 for semi-persistent CSI reports to be carried on PUSCH, y=2 for semi-persistent CSI reports to be carried on PUCCH and y=3 for periodic CSI reports to be carried on PUCCH; k=0 for CSI reports carrying L1-RSRP and k=1 for CSI reports not carrying L1-RSRP; c is the serving cell index and $N_{cells}$ is the value of the higher layer parameter maxNrofServingCells; and s is the reportConfigID and $M_s$ is the value of the higher layer parameter maxNrofCSI-ReportConfigurations.

In one example, a first CSI report is said to have priority over second CSI report if the associated $\text{Pri}_{iCSI}(y,k,c,s)$ value is lower for the first report than for the second report. Two CSI reports are said to collide if the time occupancy of the physical channels scheduled to carry the CSI reports overlap in at least one OFDM symbol and are transmitted on the same carrier. When a UE is configured to transmit two colliding CSI reports, if y values are different between the two CSI reports, the following rules apply except for the case when one of the y value is 2 and the other y value is 3 (for CSI reports transmitted on PUSCH, as described in Subclause 5.2.3 of 3GPP Technical Specification (TS) 38.214 V15.5.0 (2019-013); for CSI reports transmitted on PUCCH, as described in Subclause 5.2.4), the CSI report with higher $\text{Pri}_{iCSI}(y,k,c,s)$ value shall not be sent by the UE. Otherwise, the two CSI reports are multiplexed or either is dropped based on the priority values, as described in Subclause 9.2.5.2 in 3GPP TS 38.213.

In one example, if a semi-persistent CSI report to be carried on PUSCH overlaps in time with PUSCH data transmission in one or more symbols, and if the earliest symbol of these PUSCH channels starts no earlier than $N_2+d_{2,1}$ symbols after the last symbol of the DCI scheduling the PUSCH, the CSI report shall not be transmitted by the UE. Otherwise, if the timeline condition is not satisfied this is an error case.

In one example, if a UE would transmit a first PUSCH that includes semi-persistent CSI reports and a second PUSCH that includes an UL-SCH and the first PUSCH transmission would overlap in time with the second PUSCH transmission, the UE does not transmit the first PUSCH and transmits the second PUSCH. The UE expects that the first and second PUSCH transmissions satisfy the above timing conditions for PUSCH transmissions that overlap in time when at least one of the first or second PUSCH transmissions is in response to a DCI format detection by the UE.

In one configuration, multiple PUCCHs can be multiplexed when two or more non-overlapping PUCCH resources include at least two long PUCCHs.

In one example, in NR, two short PUCCHs, and one short and one long PUCCH can be multiplexed in a time division multiplexing (TDM) manner in a slot. Further, for UCI multiplexing on the PUCCH, the first step is to multiplex multiple CSI reports into at most two non-overlapping CSI PUCCH resources. If two non-overlapping PUCCH resources are selected, they include at least one with PUCCH format 2.

However, in the case when a dynamic HARQ-ACK PUCCH resource overlaps with a first CSI PUCCH resource using PUCCH format 2, it is likely that the determined PUCCH resource, which can be selected, based on the PUCCH resource indication and combined UCI payload size may be a long PUCCH, e.g. PUCCH format 3 and 4. If a second CSI resource does not overlap with the determined PUCCH and uses PUCCH format 3 or 4, these two long PUCCHs cannot be multiplexed in a TDM manner in a slot. Hence, certain mechanisms to handle this issue are desired.

Examples for multiplexing multiple PUCCHs when two or more non-overlapping PUCCH resources include at least two long PUCCHs are provided below.

In one example, if the UE is provided the higher layer parameter simultaneousHARQ-ACK-CSI, after HARQ-ACK/SR and CSI multiplexing, when two or more non-overlapping PUCCH resources include at least two long PUCCHs, i.e., PUCCH format 3 or 4 and they do not overlap with PUSCH, the dropping of the PUCCH resource and corresponding UCI can be defined based on a priority of UCI type and/or its transmission time domain behavior, e.g. aperiodic, periodic or semi-persistent. The priority can be predefined in the specification or configured by higher layers via an NR minimum system information (MSI), an NR remaining minimum system information (RMSI), an NR other system information (OSI) or radio resource control (RRC) signaling.

In one example, dynamic and/or SPS HARQ-ACK feedback can have a higher priority than a CSI report and SR. This can apply for the case when the combined UCI includes dynamic and/or SPS HARQ-ACK feedback. Further, a CSI report with long PUCCH and/or lower priority can be dropped.

In one example, if HARQ-ACK PUCCH resource, CSI #1 and CSI #2 PUCCH resources are multiplexed in a TDM manner in a slot, the UE can first select a HARQ-ACK PUCCH resource. If the HARQ-ACK PUCCH resource uses a short PUCCH, the UE can select CSI #1 and CSI #2 PUCCH with a higher priority and drop the CSI report with lower priority. If the HARQ-ACK PUCCH resource uses a long PUCCH, the UE can select CSI #1 and CSI #2 with a short PUCCH resource (if any) and drop the CSI #1 and CSI #2 with a long PUCCH resource. In these examples, the dropping rule for the CSI report can depend on a starting symbol of PUCCH resources. For instance, a CSI report with a later starting symbol can be dropped.

Figure 7:
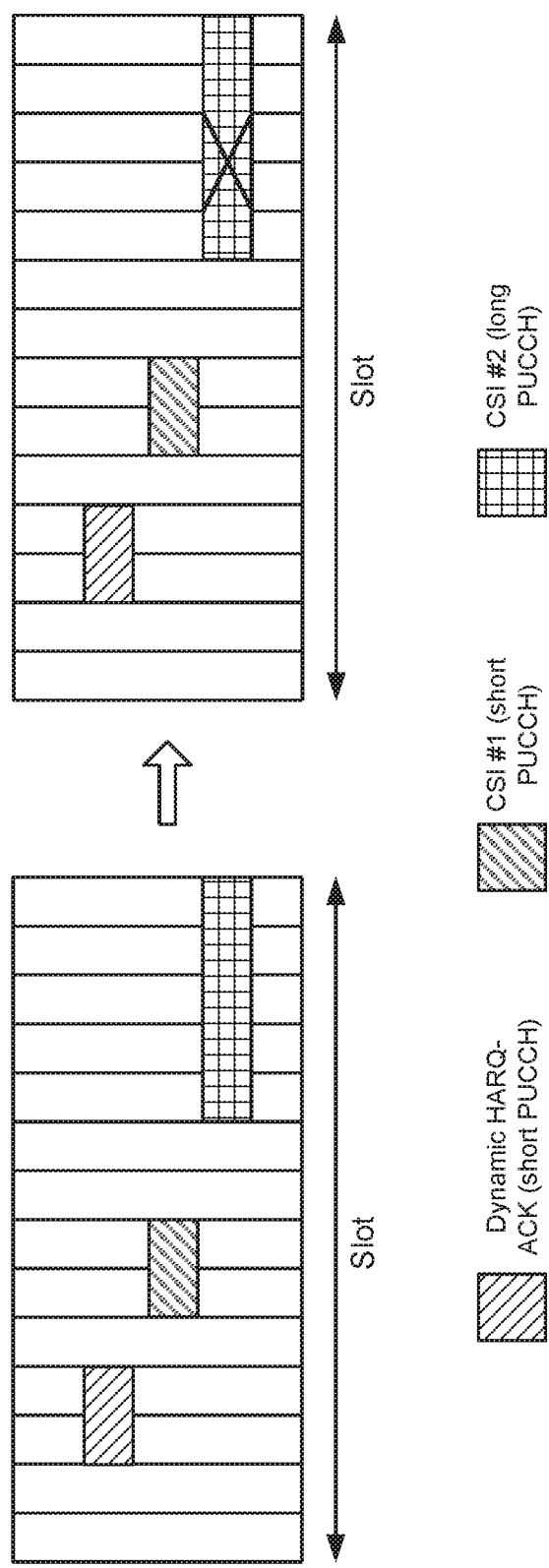
FIG. 7 illustrates a first option for a multiplexing of multiple PUCCHs when determined two or more non-overlapping PUCCH resources include at least two long PUCCHs in accordance with an example.

FIG. 7 illustrates an example of a first option for a multiplexing of multiple PUCCHs when determined two or more non-overlapping PUCCH resources include at least two long PUCCHs. In this example, CSI #1 can have a higher priority than CSI #2, and the UE can drop CSI #2 PUCCH.

In one example, if a first PUCCH resource carrying a combined HARQ-ACK and CSI #1 report uses a long PUCCH and a second PUCCH resource carrying CSI #2 uses a long PUCCH, depending on the aforementioned priority, the second PUCCH resource and corresponding CSI #2 can be dropped.

Figure 8:
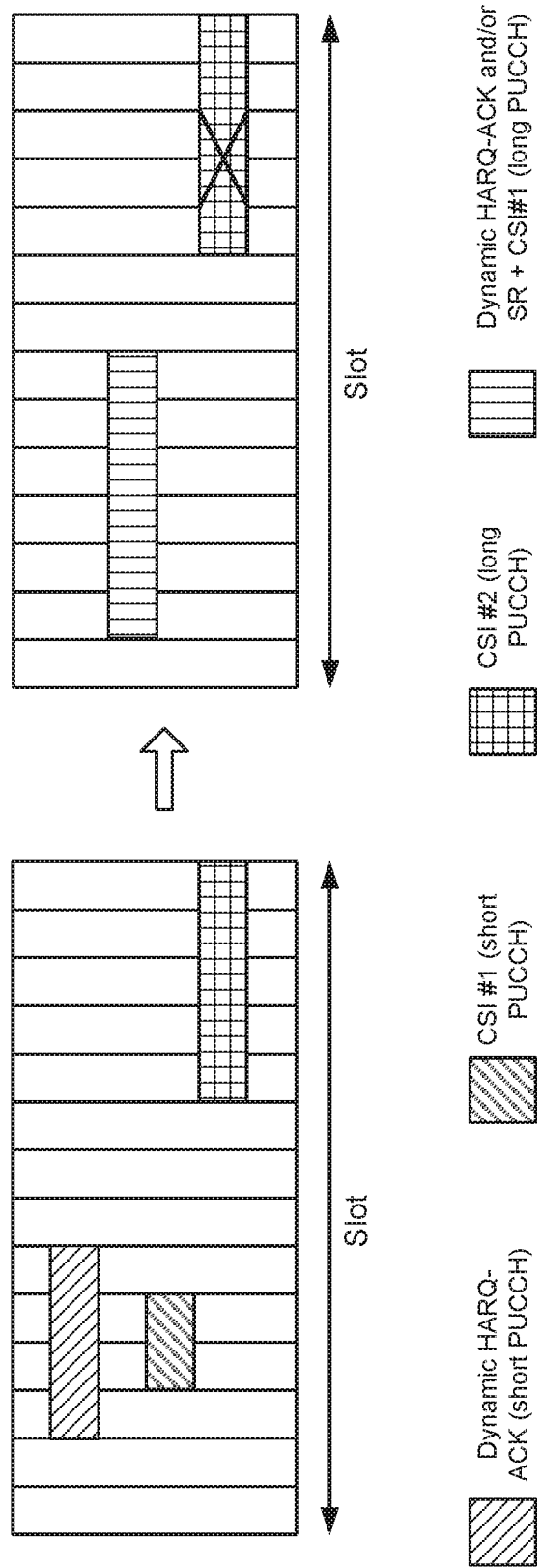
FIG. 8 illustrates a second option for a multiplexing of multiple PUCCHs when determined two or more non-overlapping PUCCH resources include at least two long PUCCHs in accordance with an example.

FIG. 8 illustrates an example of a second option for a multiplexing of multiple PUCCHs when determined two or more non-overlapping PUCCH resources include at least two long PUCCHs. Here, the two non-overlapping PUCCH resources do not include PUCCH format 2. In this example, based on a priority rule of UCI types, a HARQ-ACK can have a higher priority than a CSI report. Hence, the CSI report in the second PUCCH resource can be dropped.

In one example, an SR can have a lower priority than a CSI report. Yet in another example, the SR can have a higher priority than a CSI report. Alternatively, the SR can have a higher priority than a HARQ-ACK. This may depend on whether the SR is targeted for Ultra-Reliable Low-Latency Communication (URLLC) or enhanced Mobile Broadband (eMBB). For instance, if SR is targeted for URLLC and HARQ-ACK is for eMBB, the UE can drop the HARQ-ACK and transmit a positive SR.

Further, dynamic and SPS HARQ-ACK can have a different priority than a CSI report. For instance, a dynamic HARQ-ACK can have a greater priority than a CSI report, which can have a greater priority than SPS HARQ-ACK feedback.

In one example, the permutations of priority rules are not limited to the above options.

In one example, if the UE is provided the higher layer parameter simultaneousHARQ-ACK-CSI, after HARQ-ACK/SR and CSI multiplexing, when two determined PUCCH resources do not include short PUCCH format, i.e., PUCCH format 2 and they do not overlap with PUSCH, when UE is provided the high layer parameter multi-CSI-PUCCH-ResourceList, the UE can first combine multiple CSI reports in a resource from the resource set provided by multi-CSI-PUCCH-ResourceList. Subsequently, the UE can apply the aforementioned priority rule to select two PUCCHs with at least one short PUCCH.

In one example, a system and method of wireless communication for a fifth generation (5G) or new radio (NR) system is described. A UE can determine one or more physical uplink control channel (PUCCH) resources in a slot and corresponding uplink control information (UCI), including scheduling request (SR), hybrid automatic repeat request-acknowledgement (HARQ-ACK) feedback, and a channel state information (CSI) report. The UE can transmit one or more PUCCHs carrying the corresponding UCI.

In one example, when the UE is not provided a high layer parameter multi-CSI-PUCCH-ResourceList and when the HARQ-ACK is in response to a physical downlink shared channel (PDSCH) reception without a corresponding physical downlink control channel (PDCCH), i.e., semi-persistent scheduling (SPS) HARQ-ACK, when one or more SPS HARQ-ACK and/or SR PUCCH resource overlaps with two or more non-overlapping CSI PUCCHs, the SPS HARQ-ACK and/or SR can be multiplexed with an earliest CSI PUCCH resource.

In one example, when the UE is not provided a high layer parameter multi-CSI-PUCCH-ResourceList and when the HARQ-ACK is in response to a PDSCH reception without a corresponding PDCCH, i.e., SPS HARQ-ACK, when one or more SPS HARQ-ACK and/or SR PUCCH resource overlaps with two or more non-overlapping CSI PUCCHs, the SPS HARQ-ACK and/or SR and all CSI reports can be multiplexed with an earliest CSI PUCCH resource.

In one example, when the UE is not provided a high layer parameter multi-CSI-PUCCH-ResourceList and when the HARQ-ACK is in response to a PDSCH reception without a corresponding PDCCH, i.e., SPS HARQ-ACK, when one or more SPS HARQ-ACK and/or SR PUCCH resource overlaps with two or more non-overlapping CSI PUCCHs, the SPS HARQ-ACK and/or SR and all CSI reports can be multiplexed with a CSI PUCCH resource with a largest capacity, i.e., carrying the largest payload.

In one example, when the UE is not provided a high layer parameter multi-CSI-PUCCH-ResourceList and when the HARQ-ACK is in response to a PDSCH reception without a corresponding PDCCH, i.e., SPS HARQ-ACK, when one or more SPS HARQ-ACK and/or SR PUCCH resource overlaps with two or more non-overlapping CSI PUCCHs, the SPS HARQ-ACK and/or SR and all CSI reports can be multiplexed with a CSI PUCCH resource with a higher priority; CSI report and corresponding PUCCH resource with lower priority are dropped.

In one example, when the UE is provided by a higher layer parameter simultaneousHARQ-ACK-CSI, after HARQ-ACK/SR and CSI multiplexing, when two or more non-overlapping PUCCH resources include at least two long PUCCHs, i.e., PUCCH format 3 or 4 and they do not overlap with PUSCH, the dropping of the PUCCH resource and corresponding UCI can be defined based on the priority of UCI type and/or its transmission time domain behavior.

In one example, dynamic and/or SPS HARQ-ACK feedback can have a higher priority than a CSI report and SR. This can apply for the case when the combined UCI includes dynamic and/or SPS HARQ-ACK feedback, and a CSI report with a long PUCCH and/or lower priority can be dropped.

In one example, if a first PUCCH resource carrying a combined HARQ-ACK and CSI #1 report uses a long PUCCH and a second PUCCH resource carrying CSI #2 uses a long PUCCH, the second PUCCH resource and corresponding CSI #2 can be dropped.

In one example, a SR can have a lower priority than a CSI report. In another example, a SR can have a higher priority than a HARQ-ACK.

In one example, if the UE is provided by a higher layer parameter simultaneousHARQ-ACK-CSI, after HARQ-ACK/SR and CSI multiplexing, when two determined PUCCH resources do not include a short PUCCH format, i.e., PUCCH format 2 and they do not overlap with a PUSCH, when the UE is provided a high layer parameter multi-CSI-PUCCH-ResourceList, the UE can first combine multiple CSI reports in a resource from a resource set provided by multi-CSI-PUCCH-ResourceList.

Figure 9:
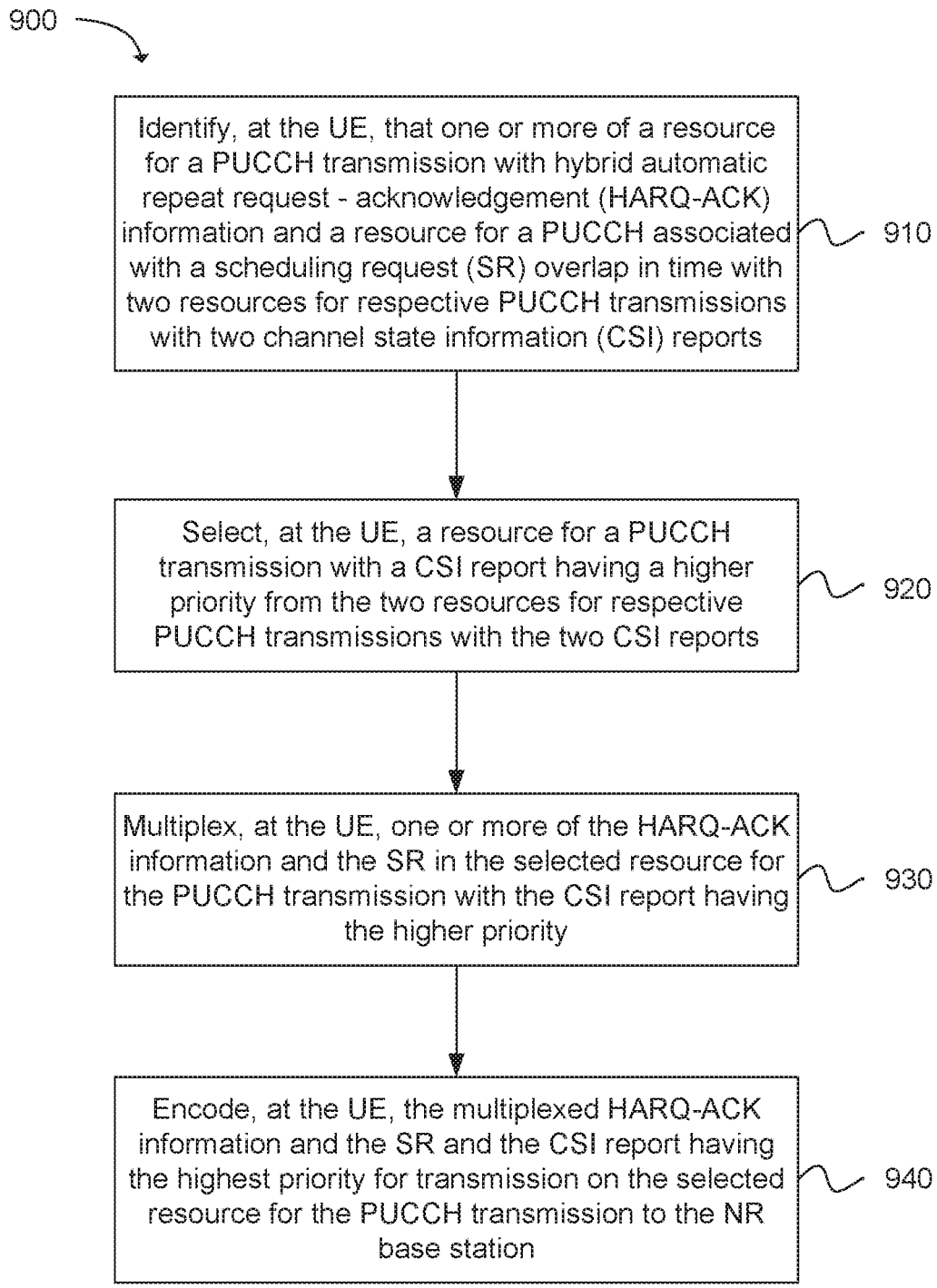
FIG. 9 depicts functionality of a user equipment (UE) operable to transmit uplink control information on a physical uplink control channel (PUCCH) to a New Radio (NR) base station in accordance with an example.

Another example provides functionality 900 of a user equipment (UE) operable to transmit uplink control information on a physical uplink control channel (PUCCH) to a New Radio (NR) base station, as shown in FIG. 9. The UE can comprise one or more processors configured to identify, at the UE, that one or more of a resource for a PUCCH transmission with hybrid automatic repeat request-acknowledgement (HARQ-ACK) information and a resource for a PUCCH associated with a scheduling request (SR) overlap in time with two resources for respective PUCCH transmissions with two channel state information (CSI) reports, as in block 910. The UE can comprise one or more processors configured to select, at the UE, a resource for a PUCCH transmission with a CSI report having a higher priority from the two resources for respective PUCCH transmissions with the two CSI reports, as in block 920. The UE can comprise one or more processors configured to multiplex, at the UE, one or more of the HARQ-ACK information and the SR in the selected resource for the PUCCH transmission with the CSI report having the higher priority, as in block 930. The UE can comprise one or more processors configured to encode, at the UE, the multiplexed HARQ-ACK information and the SR and the CSI report having the highest priority for transmission on the selected resource for the PUCCH transmission to the NR base station, as in block 940. In addition, the UE can comprise a memory interface configured to retrieve from a memory the multiplexed HARQ-ACK information and the SR and the CSI report.

Figure 10:
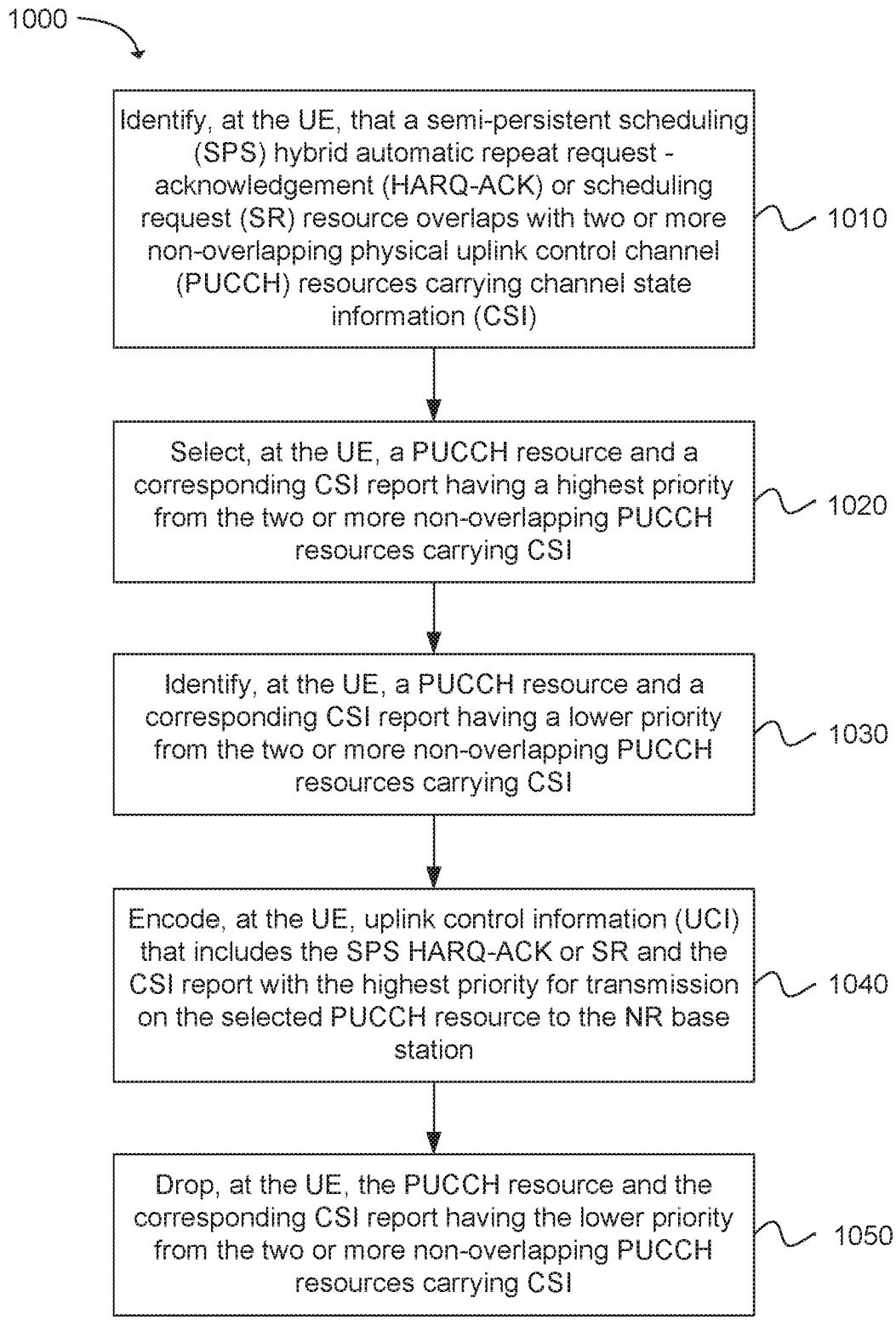
FIG. 10 depicts functionality of a user equipment (UE) operable to transmit uplink control information (UCI) on a physical uplink control channel (PUCCH) to a New Radio (NR) base station in accordance with an example.

Another example provides functionality 1000 of a user equipment (UE) operable to transmit uplink control information (UCI) on a physical uplink control channel (PUCCH) to a New Radio (NR) base station, as shown in FIG. 10. The UE can comprise one or more processors configured to identify, at the UE, that a semi-persistent scheduling (SPS) hybrid automatic repeat request-acknowledgement (HARQ-ACK) or scheduling request (SR) resource overlaps with two or more non-overlapping physical uplink control channel (PUCCH) resources carrying channel state information (CSI), as in block 1010. The UE can comprise one or more processors configured to select, at the UE, a PUCCH resource and a corresponding CSI report having a highest priority from the two or more non-overlapping PUCCH resources carrying CSI, as in block 1020. The UE can comprise one or more processors configured to identify, at the UE, a PUCCH resource and a corresponding CSI report having a lower priority from the two or more non-overlapping PUCCH resources carrying CSI, as in block 1030. The UE can comprise one or more processors configured to encode, at the UE, uplink control information (UCI) that includes the SPS HARQ-ACK or SR and the CSI report for transmission on the selected PUCCH resource to the NR base station, as in block 1040. The UE can comprise one or more processors configured to drop, at the UE, the PUCCH resource and the corresponding CSI report having the lower priority from the two or more non-overlapping PUCCH resources carrying CSI, as in block 1050. In addition, the UE can comprise a memory interface configured to retrieve from a memory the UCI.

Figure 11:
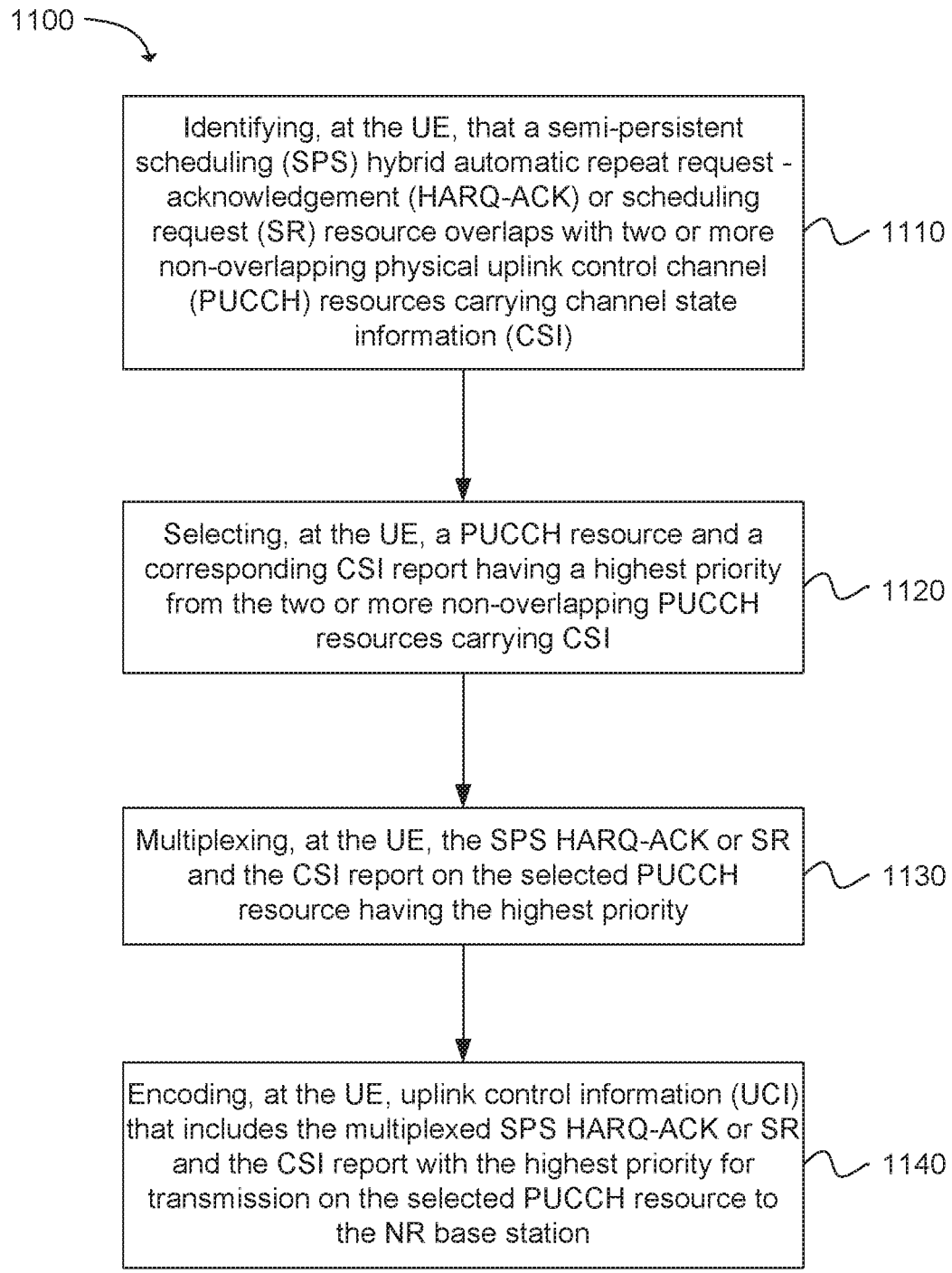
FIG. 11 depicts a flowchart of a machine readable storage medium having instructions embodied thereon for transmitting uplink control information (UCI) on a physical uplink control channel (PUCCH) from a user equipment (UE) to a New Radio (NR) base station in accordance with an example.

Another example provides at least one machine readable storage medium having instructions 1100 embodied thereon for transmitting uplink control information (UCI) on a physical uplink control channel (PUCCH) from a user equipment (UE) to a New Radio (NR) base station, as shown in FIG. 11. The instructions can be executed on a machine, where the instructions are included on at least one computer readable medium or one non-transitory machine readable storage medium. The instructions when executed by one or more processors of a UE perform: identifying, at the UE, that a semi-persistent scheduling (SPS) hybrid automatic repeat request-acknowledgement (HARQ-ACK) or scheduling request (SR) resource overlaps with two or more non-overlapping physical uplink control channel (PUCCH) resources carrying channel state information (CSI), as in block 1110. The instructions when executed by one or more processors of a UE perform: selecting, at the UE, a PUCCH resource and a corresponding CSI report having a highest priority from the two or more non-overlapping PUCCH resources carrying CSI, as in block 1120. The instructions when executed by one or more processors of a UE perform: multiplexing, at the UE, the SPS HARQ-ACK or SR and the CSI report on the selected PUCCH resource having the highest priority, as in block 1130. The instructions when executed by one or more processors of a UE perform: encoding, at the UE, uplink control information (UCI) that includes the multiplexed SPS HARQ-ACK or SR and the CSI report for transmission on the selected PUCCH resource to the NR base station, as in block 1140.

Figure 12:
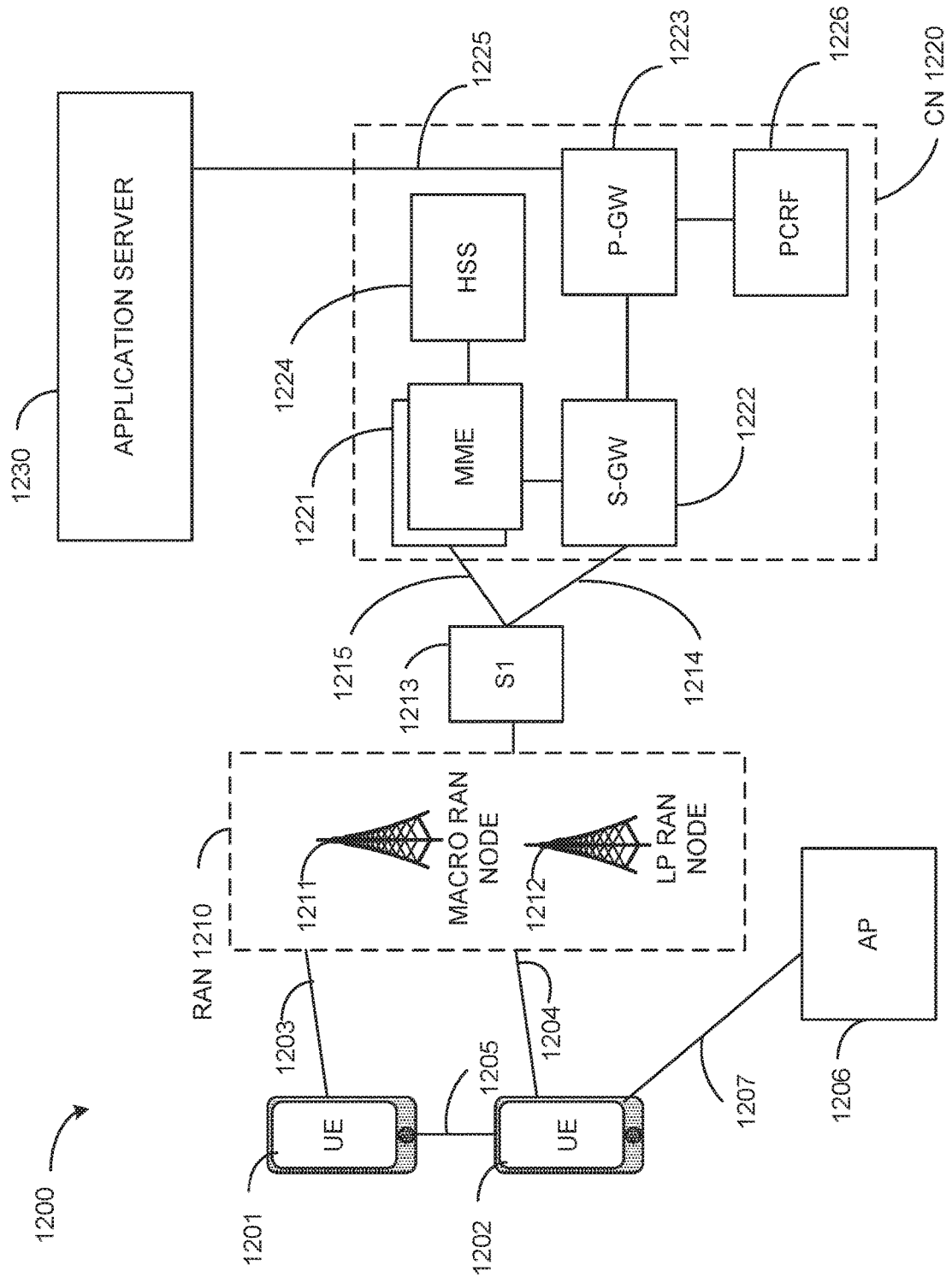
FIG. 12 illustrates an architecture of a wireless network in accordance with an example.

FIG. 12 illustrates an architecture of a system 1200 of a network in accordance with some embodiments. The system 1200 is shown to include a user equipment (UE) 1201 and a UE 1202. The UEs 1201 and 1202 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1201 and 1202 can comprise an Internet of Things (loT) UE, which can comprise a network access layer designed for low-power loT applications utilizing short-lived UE connections. An loT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or loT networks. The M2M or MTC exchange of data may be a machine-initiated exchange of data. An loT network describes interconnecting loT UEs, which may include uniquely identifiable embedded computing devices (within the Internet infrastructure), with short-lived connections. The loT UEs may execute background applications (e.g., keep-alive messages, status updates, etc.) to facilitate the connections of the loT network.

The UEs 1201 and 1202 may be configured to connect, e.g., communicatively couple, with a radio access network (RAN) 1210—the RAN 1210 may be, for example, an Evolved Universal Mobile Telecommunications System (UMTS) Terrestrial Radio Access Network (E-UTRAN), a NextGen RAN (NG RAN), or some other type of RAN. The UEs 1201 and 1202 utilize connections 1203 and 1204, respectively, each of which comprises a physical communications interface or layer (discussed in further detail below); in this example, the connections 1203 and 1204 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1201 and 1202 may further directly exchange communication data via a ProSe interface 1205. The ProSe interface 1205 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1202 is shown to be configured to access an access point (AP) 1206 via connection 1207. The connection 1207 can comprise a local wireless connection, such as a connection consistent with any IEEE 802.14 protocol, wherein the AP 1206 would comprise a wireless fidelity (WiFi®) router. In this example, the AP 1206 is shown to be connected to the Internet without connecting to the core network of the wireless system (described in further detail below).

The RAN 1210 can include one or more access nodes that enable the connections 1203 and 1204. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1210 may include one or more RAN nodes for providing macrocells, e.g., macro RAN node 1211, and one or more RAN nodes for providing femtocells or picocells (e.g., cells having smaller coverage areas, smaller user capacity, or higher bandwidth compared to macrocells), e.g., low power (LP) RAN node 1212.

Any of the RAN nodes 1211 and 1212 can terminate the air interface protocol and can be the first point of contact for the UEs 1201 and 1202. In some embodiments, any of the RAN nodes 1211 and 1212 can fulfill various logical functions for the RAN 1210 including, but not limited to, radio network controller (RNC) functions such as radio bearer management, uplink and downlink dynamic radio resource management and data packet scheduling, and mobility management.

In accordance with some embodiments, the UEs 1201 and 1202 can be configured to communicate using Orthogonal Frequency-Division Multiplexing (OFDM) communication signals with each other or with any of the RAN nodes 1211 and 1212 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1211 and 1212 to the UEs 1201 and 1202, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1201 and 1202. The physical downlink control channel (PDCCH) may carry information about the transport format and resource allocations related to the PDSCH channel, among other things. It may also inform the UEs 1201 and 1202 about the transport format, resource allocation, and HARQ (Hybrid Automatic Repeat Request) information related to the uplink shared channel. Typically, downlink scheduling (assigning control and shared channel resource blocks to the UE 1201 within a cell) may be performed at any of the RAN nodes 1211 and 1212 based on channel quality information fed back from any of the UEs 1201 and 1202. The downlink resource assignment information may be sent on the PDCCH used for (e.g., assigned to) each of the UEs 1201 and 1202.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1210 is shown to be communicatively coupled to a core network (CN) 1220—via an S1 interface 1213. In embodiments, the CN 1220 may be an evolved packet core (EPC) network, a NextGen Packet Core (NPC) network, or some other type of CN. In this embodiment the S1 interface 1213 is split into two parts: the S1-U interface 1214, which carries traffic data between the RAN nodes 1211 and 1212 and the serving gateway (S-GW) 1222, and the S1-mobility management entity (MME) interface 1215, which is a signaling interface between the RAN nodes 1211 and 1212 and MMEs 1221.

In this embodiment, the CN 1220 comprises the MMEs 1221, the S-GW 1222, the Packet Data Network (PDN) Gateway (P-GW) 1223, and a home subscriber server (HSS) 1224. The MMEs 1221 may be similar in function to the control plane of legacy Serving General Packet Radio Service (GPRS) Support Nodes (SGSN). The MMEs 1221 may manage mobility aspects in access such as gateway selection and tracking area list management. The HSS 1224 may comprise a database for network users, including subscription-related information to support the network entities' handling of communication sessions. The CN 1220 may comprise one or several HSSs 1224, depending on the number of mobile subscribers, on the capacity of the equipment, on the organization of the network, etc. For example, the HSS 1224 can provide support for routing/roaming, authentication, authorization, naming/addressing resolution, location dependencies, etc.

The S-GW 1222 may terminate the S1 interface 1213 towards the RAN 1210, and routes data packets between the RAN 1210 and the CN 1220. In addition, the S-GW 1222 may be a local mobility anchor point for inter-RAN node handovers and also may provide an anchor for inter-3GPP mobility. Other responsibilities may include lawful intercept, charging, and some policy enforcement.

The P-GW 1223 may terminate an SGi interface toward a PDN. The P-GW 1223 may route data packets between the EPC network 1223 and external networks such as a network including the application server 1230 (alternatively referred to as application function (AF)) via an Internet Protocol (IP) interface 1225. Generally, the application server 1230 may be an element offering applications that use IP bearer resources with the core network (e.g., UMTS Packet Services (PS) domain, LTE PS data services, etc.). In this embodiment, the P-GW 1223 is shown to be communicatively coupled to an application server 1230 via an IP communications interface 1225. The application server 1230 can also be configured to support one or more communication services (e.g., Voice-over-Internet Protocol (VoIP) sessions, PTT sessions, group communication sessions, social networking services, etc.) for the UEs 1201 and 1202 via the CN 1220.

The P-GW 1223 may further be a node for policy enforcement and charging data collection. Policy and Charging Enforcement Function (PCRF) 1226 is the policy and charging control element of the CN 1220. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1226 may be communicatively coupled to the application server 1230 via the P-GW 1223. The application server 1230 may signal the PCRF 1226 to indicate a new service flow and select the appropriate Quality of Service (QoS) and charging parameters. The PCRF 1226 may provision this rule into a Policy and Charging Enforcement Function (PCEF) (not shown) with the appropriate traffic flow template (TFT) and QoS class of identifier (QCI), which commences the QoS and charging as specified by the application server 1230.

Figure 13:
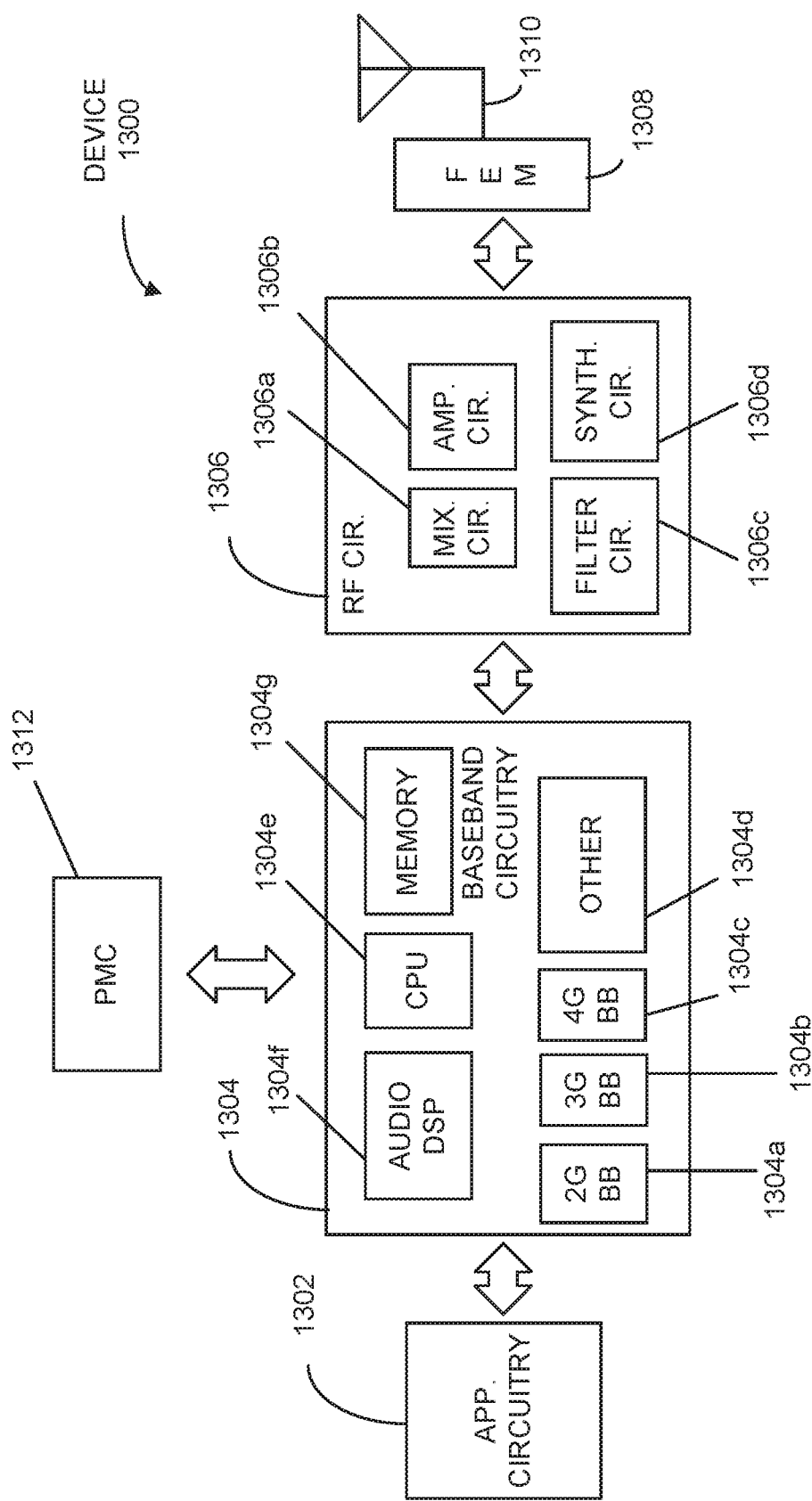
FIG. 13 illustrates a diagram of a wireless device (e.g., UE) in accordance with an example.

FIG. 13 illustrates example components of a device 1300 in accordance with some embodiments. In some embodiments, the device 1300 may include application circuitry 1302, baseband circuitry 1304, Radio Frequency (RF) circuitry 1306, front-end module (FEM) circuitry 1308, one or more antennas 1310, and power management circuitry (PMC) 1312 coupled together at least as shown. The components of the illustrated device 1300 may be included in a UE or a RAN node. In some embodiments, the device 1300 may include less elements (e.g., a RAN node may not utilize application circuitry 1302, and instead include a processor/controller to process IP data received from an EPC). In some embodiments, the device 1300 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1302 may include one or more application processors. For example, the application circuitry 1302 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1300. In some embodiments, processors of application circuitry 1302 may process IP data packets received from an EPC.

The baseband circuitry 1304 may include circuitry such as, but not limited to, one or more single-core or multi-core processors. The baseband circuitry 1304 may include one or more baseband processors or control logic to process baseband signals received from a receive signal path of the RF circuitry 1306 and to generate baseband signals for a transmit signal path of the RF circuitry 1306. Baseband processing circuitry 1304 may interface with the application circuitry 1302 for generation and processing of the baseband signals and for controlling operations of the RF circuitry 1306. For example, in some embodiments, the baseband circuitry 1304 may include a third generation (3G) baseband processor 1304a, a fourth generation (4G) baseband processor 1304b, a fifth generation (5G) baseband processor 1304c, or other baseband processor(s) 1304d for other existing generations, generations in development or to be developed in the future (e.g., second generation (2G), sixth generation (6G), etc.). The baseband circuitry 1304 (e.g., one or more of baseband processors 1304a-d) may handle various radio control functions that enable communication with one or more radio networks via the RF circuitry 1306. In other embodiments, some or all of the functionality of baseband processors 1304a-d may be included in modules stored in the memory 1304g and executed via a Central Processing Unit (CPU) 1304e. The radio control functions may include, but are not limited to, signal modulation/demodulation, encoding/decoding, radio frequency shifting, etc. In some embodiments, modulation/demodulation circuitry of the baseband circuitry 1304 may include Fast-Fourier Transform (FFT), precoding, or constellation mapping/demapping functionality. In some embodiments, encoding/decoding circuitry of the baseband circuitry 1304 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1304 may include one or more audio digital signal processor(s) (DSP) 1304f. The audio DSP(s) 1304f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1304 and the application circuitry 1302 may be implemented together such as, for example, on a system on a chip (SOC).

In some embodiments, the baseband circuitry 1304 may provide for communication compatible with one or more radio technologies. For example, in some embodiments, the baseband circuitry 1304 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 1304 is configured to support radio communications of more than one wireless protocol may be referred to as multi-mode baseband circuitry.

RF circuitry 1306 may enable communication with wireless networks using modulated electromagnetic radiation through a non-solid medium. In various embodiments, the RF circuitry 1306 may include switches, filters, amplifiers, etc. to facilitate the communication with the wireless network. RF circuitry 1306 may include a receive signal path which may include circuitry to down-convert RF signals received from the FEM circuitry 1308 and provide baseband signals to the baseband circuitry 1304. RF circuitry 1306 may also include a transmit signal path which may include circuitry to up-convert baseband signals provided by the baseband circuitry 1304 and provide RF output signals to the FEM circuitry 1308 for transmission.

In some embodiments, the receive signal path of the RF circuitry 1306 may include mixer circuitry 1306a, amplifier circuitry 1306b and filter circuitry 1306c. In some embodiments, the transmit signal path of the RF circuitry 1306 may include filter circuitry 1306c and mixer circuitry 1306a. RF circuitry 1306 may also include synthesizer circuitry 1306d for synthesizing a frequency for use by the mixer circuitry 1306a of the receive signal path and the transmit signal path. In some embodiments, the mixer circuitry 1306a of the receive signal path may be configured to down-convert RF signals received from the FEM circuitry 1308 based on the synthesized frequency provided by synthesizer circuitry 1306d. The amplifier circuitry 1306b may be configured to amplify the down-converted signals and the filter circuitry 1306c may be a low-pass filter (LPF) or band-pass filter (BPF) configured to remove unwanted signals from the down-converted signals to generate output baseband signals. Output baseband signals may be provided to the baseband circuitry 1304 for further processing. In some embodiments, the output baseband signals may be zero-frequency baseband signals. In some embodiments, mixer circuitry 1306a of the receive signal path may comprise passive mixers, although the scope of the embodiments is not limited in this respect.

In some embodiments, the mixer circuitry 1306a of the transmit signal path may be configured to up-convert input baseband signals based on the synthesized frequency provided by the synthesizer circuitry 1306d to generate RF output signals for the FEM circuitry 1308. The baseband signals may be provided by the baseband circuitry 1304 and may be filtered by filter circuitry 1306c.

In some embodiments, the mixer circuitry 1306a of the receive signal path and the mixer circuitry 1306a of the transmit signal path may include two or more mixers and may be arranged for quadrature downconversion and upconversion, respectively. In some embodiments, the mixer circuitry 1306a of the receive signal path and the mixer circuitry 1306a of the transmit signal path may include two or more mixers and may be arranged for image rejection (e.g., Hartley image rejection). In some embodiments, the mixer circuitry 1306a of the receive signal path and the mixer circuitry 1306a may be arranged for direct downconversion and direct upconversion, respectively. In some embodiments, the mixer circuitry 1306a of the receive signal path and the mixer circuitry 1306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1306 may include analog-to-digital converter (ADC) and digital-to-analog converter (DAC) circuitry and the baseband circuitry 1304 may include a digital baseband interface to communicate with the RF circuitry 1306.

In some dual-mode embodiments, a separate radio IC circuitry may be provided for processing signals for each spectrum, although the scope of the embodiments is not limited in this respect.

In some embodiments, the synthesizer circuitry 1306d may be a fractional-N synthesizer or a fractional N/N+1 synthesizer, although the scope of the embodiments is not limited in this respect as other types of frequency synthesizers may be suitable. For example, synthesizer circuitry 1306d may be a delta-sigma synthesizer, a frequency multiplier, or a synthesizer comprising a phase-locked loop with a frequency divider.

The synthesizer circuitry 1306d may be configured to synthesize an output frequency for use by the mixer circuitry 1306a of the RF circuitry 1306 based on a frequency input and a divider control input. In some embodiments, the synthesizer circuitry 1306d may be a fractional N/N+1 synthesizer.

In some embodiments, frequency input may be provided by a voltage controlled oscillator (VCO). Divider control input may be provided by either the baseband circuitry 1304 or the applications processor 1302 depending on the desired output frequency. In some embodiments, a divider control input (e.g., N) may be determined from a look-up table based on a channel indicated by the applications processor 1302.

Synthesizer circuitry 1306d of the RF circuitry 1306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1306d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1306 may include an IQ/polar converter.

FEM circuitry 1308 may include a receive signal path which may include circuitry configured to operate on RF signals received from one or more antennas 1310, amplify the received signals and provide the amplified versions of the received signals to the RF circuitry 1306 for further processing. FEM circuitry 1308 may also include a transmit signal path which may include circuitry configured to amplify signals for transmission provided by the RF circuitry 1306 for transmission by one or more of the one or more antennas 1310. In various embodiments, the amplification through the transmit or receive signal paths may be done solely in the RF circuitry 1306, solely in the FEM 1308, or in both the RF circuitry 1306 and the FEM 1308.

In some embodiments, the FEM circuitry 1308 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1306). The transmit signal path of the FEM circuitry 1308 may include a power amplifier (PA) to amplify input RF signals (e.g., provided by RF circuitry 1306), and one or more filters to generate RF signals for subsequent transmission (e.g., by one or more of the one or more antennas 1310).

In some embodiments, the PMC 1312 may manage power provided to the baseband circuitry 1304. In particular, the PMC 1312 may control power-source selection, voltage scaling, battery charging, or DC-to-DC conversion. The PMC 1312 may often be included when the device 1300 is capable of being powered by a battery, for example, when the device is included in a UE. The PMC 1312 may increase the power conversion efficiency while providing desirable implementation size and heat dissipation characteristics.

While FIG. 13 shows the PMC 1312 coupled only with the baseband circuitry 1304. However, in other embodiments, the PMC 13 12 may be additionally or alternatively coupled with, and perform similar power management operations for, other components such as, but not limited to, application circuitry 1302, RF circuitry 1306, or FEM 1308.

In some embodiments, the PMC 1312 may control, or otherwise be part of, various power saving mechanisms of the device 1300. For example, if the device 1300 is in an RRC_Connected state, where it is still connected to the RAN node as it expects to receive traffic shortly, then it may enter a state known as Discontinuous Reception Mode (DRX) after a period of inactivity. During this state, the device 1300 may power down for brief intervals of time and thus save power.

If there is no data traffic activity for an extended period of time, then the device 1300 may transition off to an RRC_Idle state, where it disconnects from the network and does not perform operations such as channel quality feedback, handover, etc. The device 1300 goes into a very low power state and it performs paging where again it periodically wakes up to listen to the network and then powers down again. The device 1300 may not receive data in this state, in order to receive data, it can transition back to RRC_Connected state.

An additional power saving mode may allow a device to be unavailable to the network for periods longer than a paging interval (ranging from seconds to a few hours). During this time, the device is unreachable to the network and may power down completely. Any data sent during this time incurs a large delay and it is assumed the delay is acceptable.

Processors of the application circuitry 1302 and processors of the baseband circuitry 1304 may be used to execute elements of one or more instances of a protocol stack. For example, processors of the baseband circuitry 1304, alone or in combination, may be used execute Layer 3, Layer 2, or Layer 1 functionality, while processors of the application circuitry 1304 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 14:
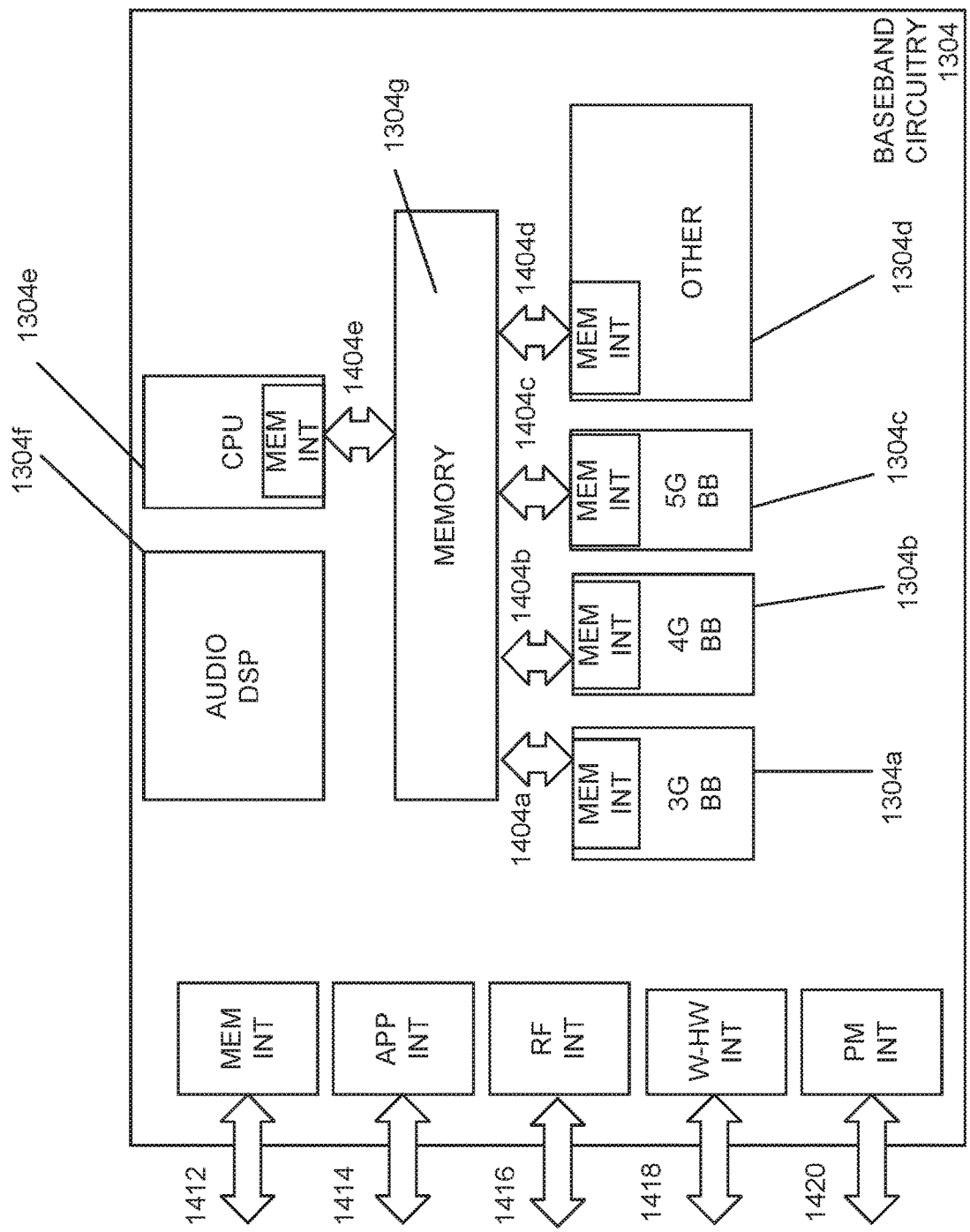
FIG. 14 illustrates interfaces of baseband circuitry in accordance with an example.

FIG. 14 illustrates example interfaces of baseband circuitry in accordance with some embodiments. As discussed above, the baseband circuitry 1304 of FIG. 13 may comprise processors 1304a-1304e and a memory 1304g utilized by said processors. Each of the processors 1304a-1304e may include a memory interface, 1404a-1404e, respectively, to send/receive data to/from the memory 1304g.

The baseband circuitry 1304 may further include one or more interfaces to communicatively couple to other circuitries/devices, such as a memory interface 1412 (e.g., an interface to send/receive data to/from memory external to the baseband circuitry 1304), an application circuitry interface 1414 (e.g., an interface to send/receive data to/from the application circuitry 1302 of FIG. 13), an RF circuitry interface 1416 (e.g., an interface to send/receive data to/from RF circuitry 1306 of FIG. 13), a wireless hardware connectivity interface 1418 (e.g., an interface to send/receive data to/from Near Field Communication (NFC) components, Bluetooth® components (e.g., Bluetooth® Low Energy), Wi-Fi® components, and other communication components), and a power management interface 1420 (e.g., an interface to send/receive power or control signals to/from the PMC 1312.

Figure 15:
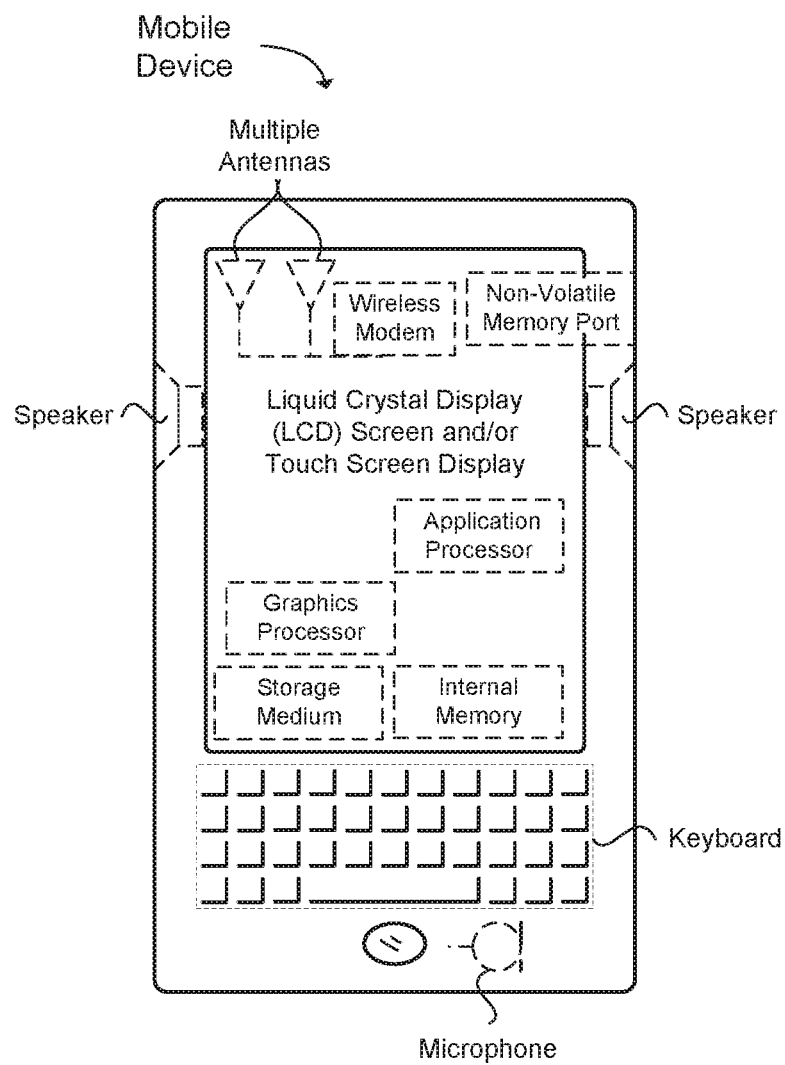
FIG. 15 illustrates a diagram of a wireless device (e.g., UE) in accordance with an example.

FIG. 15 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 15 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a user equipment (UE) operable to transmit uplink control information on a physical uplink control channel (PUCCH) to a New Radio (NR) base station, the apparatus comprising: one or more processors configured to: identify, at the UE, that one or more of a resource for a PUCCH transmission with hybrid automatic repeat request-acknowledgement (HARQ-ACK) information and a resource for a PUCCH associated with a scheduling request (SR) overlap in time with two resources for respective PUCCH transmissions with two channel state information (CSI) reports; select, at the UE, a resource for a PUCCH transmission with a CSI report having a higher priority from the two resources for respective PUCCH transmissions with the two CSI reports; multiplex, at the UE, one or more of the HARQ-ACK information and the SR in the selected resource for the PUCCH transmission with the CSI report having the higher priority; and encode, at the UE, the multiplexed HARQ-ACK information and the SR and the CSI report having the highest priority for transmission on the selected resource for the PUCCH transmission to the NR base station; and a memory interface configured to retrieve from a memory the multiplexed HARQ-ACK information and the SR and the CSI report.

Example 2 includes the apparatus of Example 1, further comprising a transceiver configured to transmit the multiplexed HARQ-ACK information and the SR and the CSI report having the highest priority to the NR base station.

Example 3 includes the apparatus of any of Examples 1 to 2, wherein the one or more processors are configured to multiplex the HARQ-ACK information and the SR in the selected resource for the PUCCH transmission with the CSI report having the higher priority when the UE does not receive a multi-CSI-PUCCH-ResourceList parameter from the NR base station.

Example 4 includes the apparatus of any of Examples 1 to 3, wherein the HARQ-ACK information is in response to a semi-persistent scheduling (SPS) physical downlink shared channel (PDSCH) reception at the UE.

Example 5 includes the apparatus of any of Examples 1 to 4, wherein the one or more processors are configured to not perform a PUCCH transmission with a CSI report having a lowest priority from the PUCCH transmissions with the two CSI reports.

Example 6 includes an apparatus of a user equipment (UE) operable to transmit uplink control information (UCI) on a physical uplink control channel (PUCCH) to a New Radio (NR) base station, the apparatus comprising: one or more processors configured to: identify, at the UE, that a semi-persistent scheduling (SPS) hybrid automatic repeat request-acknowledgement (HARQ-ACK) or scheduling request (SR) resource overlaps with two or more non-overlapping physical uplink control channel (PUCCH) resources carrying channel state information (CSI); select, at the UE, a PUCCH resource and a corresponding CSI report having a highest priority from the two or more non-overlapping PUCCH resources carrying CSI; identify, at the UE, a PUCCH resource and a corresponding CSI report having a lower priority from the two or more non-overlapping PUCCH resources carrying CSI; encode, at the UE, uplink control information (UCI) that includes the SPS HARQ-ACK or SR and the CSI report with the highest priority for transmission on the selected PUCCH resource to the NR base station; and drop, at the UE, the PUCCH resource and the corresponding CSI report having the lower priority from the two or more non-overlapping PUCCH resources carrying CSI; and a memory interface configured to retrieve from a memory the UCI.

Example 7 includes the apparatus of Example 6, further comprising a transceiver configured to transmit the UCI to the NR base station.

Example 8 includes the apparatus of any of Examples 6 to 7, wherein the one or more processors are configured to multiplex multiple PUCCH resources in a slot to ensure alignment between the NR base station and the UE.

Example 9 includes the apparatus of any of Examples 6 to 8, wherein the one or more processors are configured to multiplex the SPS HARQ-ACK or SR and the CSI report on the selected PUCCH resource having the highest priority in a slot.

Example 10 includes the apparatus of any of Examples 6 to 9, wherein the one or more processors are configured to multiplex the SPS HARQ-ACK or SR and the CSI report on the selected PUCCH resource having the highest priority when the UE does not receive a high layer parameter of multi-CSI-PUCCH-ResourceList from the NR base station.

Example 11 includes the apparatus of any of Examples 6 to 10, wherein the selected PUCCH resource is an earliest PUCCH resource among the two or more non-overlapping PUCCH resources carrying CSI.

Example 12 includes the apparatus of any of Examples 6 to 11, wherein the SPS HARQ-ACK is in response to a physical downlink shared channel (PDSCH) reception at the UE without a corresponding physical downlink control channel (PDCCH) reception at the UE.

Example 13 includes the apparatus of any of Examples 6 to 12, wherein a first CSI report has a higher priority as compared to a second CSI report when a first priority value associated with the first CSI report is lower than a second priority value associated with the second CSI report.

Example 14 includes at least one non-transitory machine readable storage medium having instructions embodied thereon for transmitting uplink control information (UCI) on a physical uplink control channel (PUCCH) from a user equipment (UE) to a New Radio (NR) base station, the instructions when executed by one or more processors at the UE perform the following: identifying, at the UE, that a semi-persistent scheduling (SPS) hybrid automatic repeat request-acknowledgement (HARQ-ACK) or scheduling request (SR) resource overlaps with two or more non-overlapping physical uplink control channel (PUCCH) resources carrying channel state information (CSI); selecting, at the UE, a PUCCH resource and a corresponding CSI report having a highest priority from the two or more non-overlapping PUCCH resources carrying CSI; multiplexing, at the UE, the SPS HARQ-ACK or SR and the CSI report on the selected PUCCH resource having the highest priority; and encoding, at the UE, uplink control information (UCI) that includes the multiplexed SPS HARQ-ACK or SR and the CSI report with the highest priority for transmission on the selected PUCCH resource to the NR base station.

Example 15 includes the at least one non-transitory machine readable storage medium of Example 14, further comprising instructions when executed perform the following: multiplexing the SPS HARQ-ACK or SR and the CSI report on the selected PUCCH resource having the highest priority when the UE does not receive a high layer parameter of multi-CSI-PUCCH-ResourceList from the NR base station.

Example 16 includes the at least one non-transitory machine readable storage medium of any of Examples 14 to 15, wherein the SPS HARQ-ACK is in response to a physical downlink shared channel (PDSCH) reception at the UE without a corresponding physical downlink control channel (PDCCH) reception at the UE.

Example 17 includes the at least one non-transitory machine readable storage medium of any of Examples 14 to 16, further comprising instructions when executed perform the following: multiplexing the SPS HARQ-ACK or SR and the CSI report on the selected PUCCH resource having the highest priority in a slot.

Example 18 includes the at least one non-transitory machine readable storage medium of any of Examples 14 to 17, further comprising instructions when executed perform the following: dropping a PUCCH resource and a corresponding CSI report having a lower priority from the two or more non-overlapping PUCCH resources carrying CSI.

Example 19 includes the at least one non-transitory machine readable storage medium of any of Examples 14 to 18, further comprising instructions when executed perform the following: multiplexing multiple PUCCH resources in a slot to ensure alignment between the NR base station and the UE.

Example 20 includes the at least one non-transitory machine readable storage medium of any of Examples 14 to 19, wherein a first CSI report has a higher priority as compared to a second CSI report when a first priority value associated with the first CSI report is lower than a second priority value associated with the second CSI report.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology.

What is claimed is:

1. An apparatus of a user equipment (UE) operable to transmit uplink control information (UCI) on a physical uplink control channel (PUCCH) to a New Radio (NR) base station, the apparatus comprising:
  one or more processors configured to:
    identify, at the UE, that a resource comprising one or more of a semi-persistent scheduling (SPS) hybrid automatic repeat request—acknowledgement (HARQ-ACK) and a scheduling request (SR) overlaps with two or more non-overlapping physical uplink control channel (PUCCH) resources carrying channel state information (CSI);
    select, at the UE, a PUCCH resource and a corresponding CSI report having a highest priority from the two or more non-overlapping PUCCH resources carrying CSI;
    identify, at the UE, a PUCCH resource and a corresponding CSI report having a lower priority from the two or more non-overlapping PUCCH resources carrying CSI;
    determine, at the UE, whether the UE has received a multi-CSI-PUCCH-ResourceList higher-layer parameter from the NR base station;
    multiplex the one or more of the SPS HARQ-ACK and the SR and the CSI report on the selected PUCCH resource having the highest priority in a slot in response to a determination that the UE has not received a multi-CSI-PUCCH-ResourceList higher-layer parameter from the NR base station and the HARQ-ACK is in response to a PDSCH reception without a corresponding physical downlink control channel (PDCCH);

encode, at the UE, uplink control information (UCI) that includes the multiplexed one or more of the SPS HARQ-ACK and the SR and the CSI report with the highest priority for transmission on the selected PUCCH resource to the NR base station; and drop, at the UE, the PUCCH resource and the corresponding CSI report having the lower priority from the two or more non-overlapping PUCCH resources carrying CSI in response to the determination that the UE has not received a multi-CSI-PUCCH-ResourceList higher-layer parameter from the NR base station and the HARQ-ACK is in response to a PDSCH reception without a corresponding PDCCH; and a memory interface configured to retrieve from a memory the UCI.

2. The apparatus of claim 1, further comprising a transceiver configured to transmit the UCI to the NR base station.

3. The apparatus of claim 1, wherein the one or more processors are configured to multiplex multiple PUCCH resources in a slot to ensure alignment between the NR base station and the UE.

4. The apparatus of claim 1, wherein the one or more processors are configured to multiplex the one or more of the SPS HARQ-ACK and the SR and the CSI report on the selected PUCCH resource having the highest priority in a slot.

5. The apparatus of claim 1, wherein the selected PUCCH resource is an earliest PUCCH resource among the two or more non-overlapping PUCCH resources carrying CSI.

6. The apparatus of claim 1, wherein the resource comprising one or more of the SPS HARQ-ACK and the SR comprises the SPS HARQ-ACK, and wherein the SPS HARQ-ACK is in response to a physical downlink shared channel (PDSCH) reception at the UE without a corresponding physical downlink control channel (PDCCH) reception at the UE.

7. The apparatus of claim 1, wherein a first CSI report has a higher priority as compared to a second CSI report when a first priority value associated with the first CSI report is lower than a second priority value associated with the second CSI report.

8. At least one non-transitory machine readable storage medium having instructions embodied thereon for transmitting uplink control information (UCI) on a physical uplink control channel (PUCCH) from a user equipment (UE) to a New Radio (NR) base station, the instructions when executed by one or more processors at the UE perform the following:

identifying, at the UE, that a resource comprising one or more of a semi-persistent scheduling (SPS) hybrid automatic repeat request—acknowledgement (HARQ-ACK) and a scheduling request (SR) overlaps with two or more non-overlapping physical uplink control channel (PUCCH) resources carrying channel state information (CSI);

selecting, at the UE, a PUCCH resource and a corresponding CSI report having a highest priority from the two or more non-overlapping PUCCH resources carrying CSI;

determine, at the UE, whether the UE has received a multi-CSI-PUCCH-ResourceList higher-layer parameter from the NR base station;

multiplexing, at the UE, the one or more of the SPS HARQ-ACK and the SR and the CSI report on the selected PUCCH resource having the highest priority in response to a determination that the UE has not received a multi-CSI-PUCCH-ResourceList higher-layer parameter from the NR base station and the HARQ-ACK is in response to a PDSCH reception without a corresponding PDCCH;

encoding, at the UE, uplink control information (UCI) that includes the multiplexed SPS HARQ-ACK or SR and the CSI report with the highest priority for transmission on the selected PUCCH resource to the NR base station; and dropping a PUCCH resource and a corresponding CSI report having a lower priority from the two or more non-overlapping PUCCH resources carrying CSI in response to the determination that the UE has not received a multi-CSI-PUCCH-ResourceList higher-layer parameter from the NR base station and the HARQ-ACK is in response to a PDSCH reception without a corresponding PDCCH.

9. The at least one non-transitory machine readable storage medium of claim 8, wherein the resource comprising one or more of the SPS HARQ-ACK and the SR comprises the SPS HARQ-ACK, wherein the SPS HARQ-ACK is in response to a physical downlink shared channel (PDSCH) reception at the UE without a corresponding physical downlink control channel (PDCCH) reception at the UE.

10. The at least one non-transitory machine readable storage medium of claim 8, further comprising instructions when executed perform the following: multiplexing the one or more of the SPS HARQ-ACK and the SR and the CSI report on the selected PUCCH resource having the highest priority in a slot.

11. The at least one non-transitory machine readable storage medium of claim 8, further comprising instructions when executed perform the following: multiplexing multiple PUCCH resources in a slot to ensure alignment between the NR base station and the UE.

12. The at least one non-transitory machine readable storage medium of claim 8, wherein a first CSI report has a higher priority as compared to a second CSI report when a first priority value associated with the first CSI report is lower than a second priority value associated with the second CSI report.

* * * * *